United States Patent [19]

Orlowski

[11] Patent Number: 4,529,101
[45] Date of Patent: Jul. 16, 1985

[54] APPARATUS FOR SEPARATING NESTED CUP-SHAPED CONTAINERS

[75] Inventor: Gerald J. Orlowski, Scottsdale, Ariz.

[73] Assignee: Armour Food Company, Omaha, Nebr.

[21] Appl. No.: 401,686

[22] Filed: Jul. 26, 1982

[51] Int. Cl.³ .............................................. B65H 3/32
[52] U.S. Cl. ..................................... 221/11; 221/223
[58] Field of Search ............... 221/11, 221, 232, 238, 221/223; 414/125, 126

[56] References Cited

U.S. PATENT DOCUMENTS

| | | | |
|---|---|---|---|
| 1,881,894 | 10/1932 | Olsen . | |
| 2,385,267 | 9/1945 | Franz | 312/44 |
| 2,942,758 | 6/1960 | Hogstrom | 221/222 |
| 3,034,683 | 5/1962 | Wilson | 221/1 |
| 3,120,324 | 2/1964 | Amberg | 221/4 |
| 3,283,955 | 11/1966 | Crabtree | 221/251 |
| 3,347,413 | 10/1967 | Kopera | 221/11 |
| 3,379,346 | 4/1968 | Frederick | 221/224 |
| 3,415,416 | 12/1968 | Broersma | 221/221 |
| 3,472,403 | 10/1969 | Mueller et al. | 221/11 X |
| 3,506,156 | 4/1970 | Hanson | 221/11 |
| 3,520,444 | 7/1970 | Manzer | 221/11 |
| 3,542,243 | 11/1970 | Stockdale | 221/221 |
| 3,576,275 | 4/1971 | Bookout | 221/11 |
| 3,591,041 | 7/1971 | DiGrande | 221/11 |
| 3,664,521 | 5/1972 | Feher | 214/8.5 K |
| 3,712,506 | 1/1973 | Brownbill | 221/11 |
| 3,771,691 | 11/1973 | Rockola | 221/11 |
| 3,807,600 | 4/1974 | Moss | 221/11 |
| 3,819,086 | 6/1974 | Paolucci | 221/11 |
| 3,843,019 | 10/1974 | Medendorp | 221/225 |
| 3,937,360 | 2/1976 | Doucette | 221/11 |
| 4,054,212 | 10/1977 | Mueller | 214/8.5 A |

Primary Examiner—Stanley H. Tollberg
Attorney, Agent, or Firm—Willian Brinks Olds Hofer Gilson & Lione Ltd.

[57] ABSTRACT

Apparatus for automatically separating stacks of nested, cup-shaped containers having outwardly projecting lips around the rims thereof so that individual containers are continuously supplied to a point of use. The apparatus includes a separating mechanism for continuously separating the containers in a stack. This separating mechanism utilizes holding shoes for supporting the stack by means of shoes which contact the lip of the lowermost container. The apparatus also includes a conveyor mechanism which advances stacks of containers to a staging station. A gate arrangement is provided at the staging station to create a separation between adjacent stacks of containers and to drop consecutive ones of the stacks into the separating mechanism.

30 Claims, 20 Drawing Figures

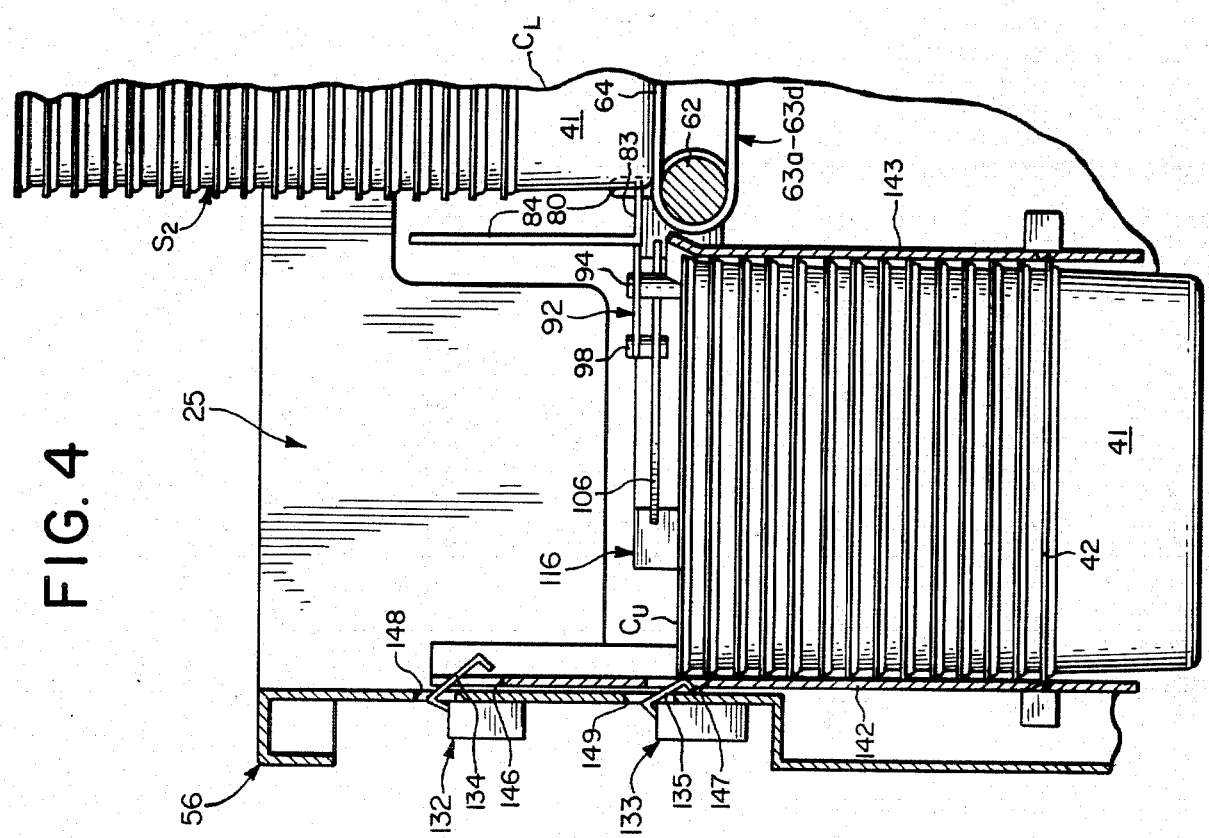
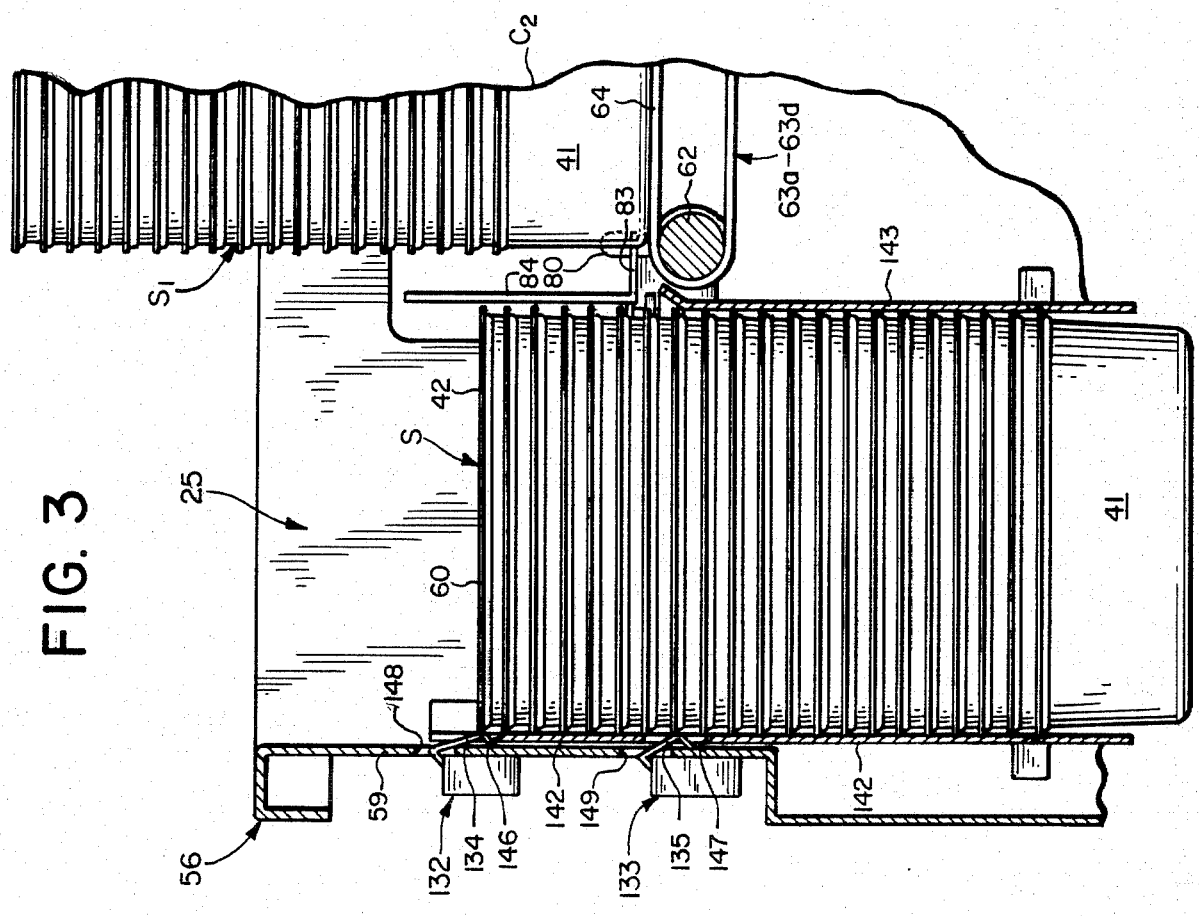

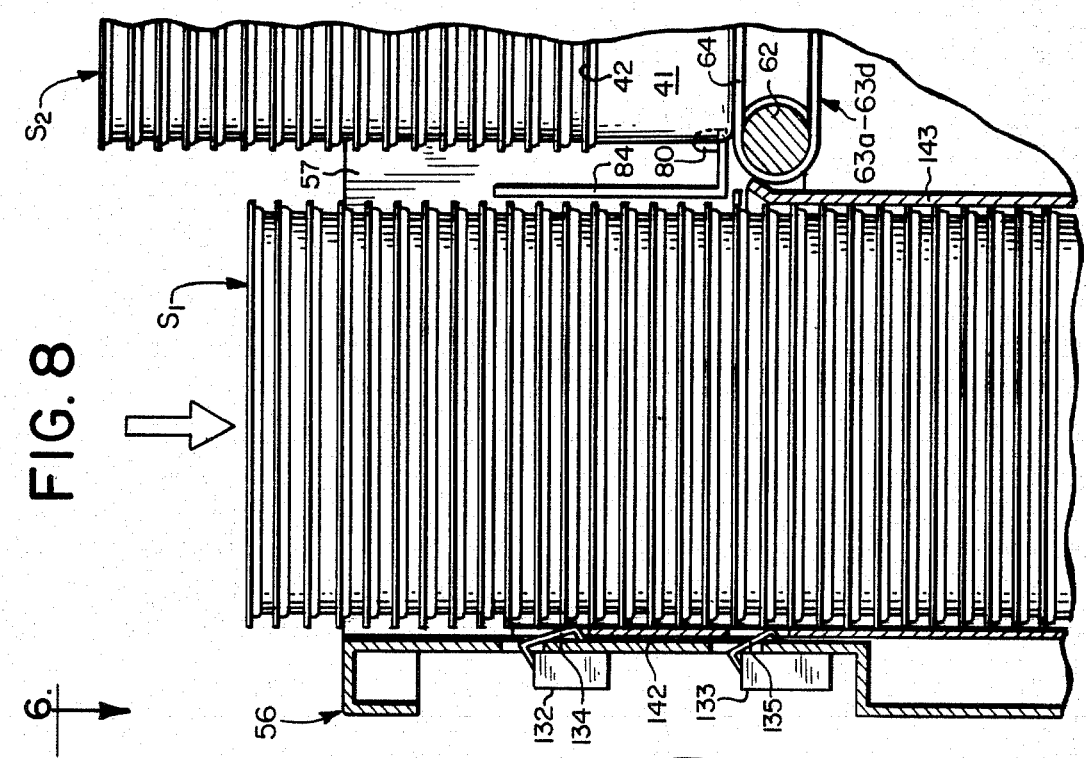
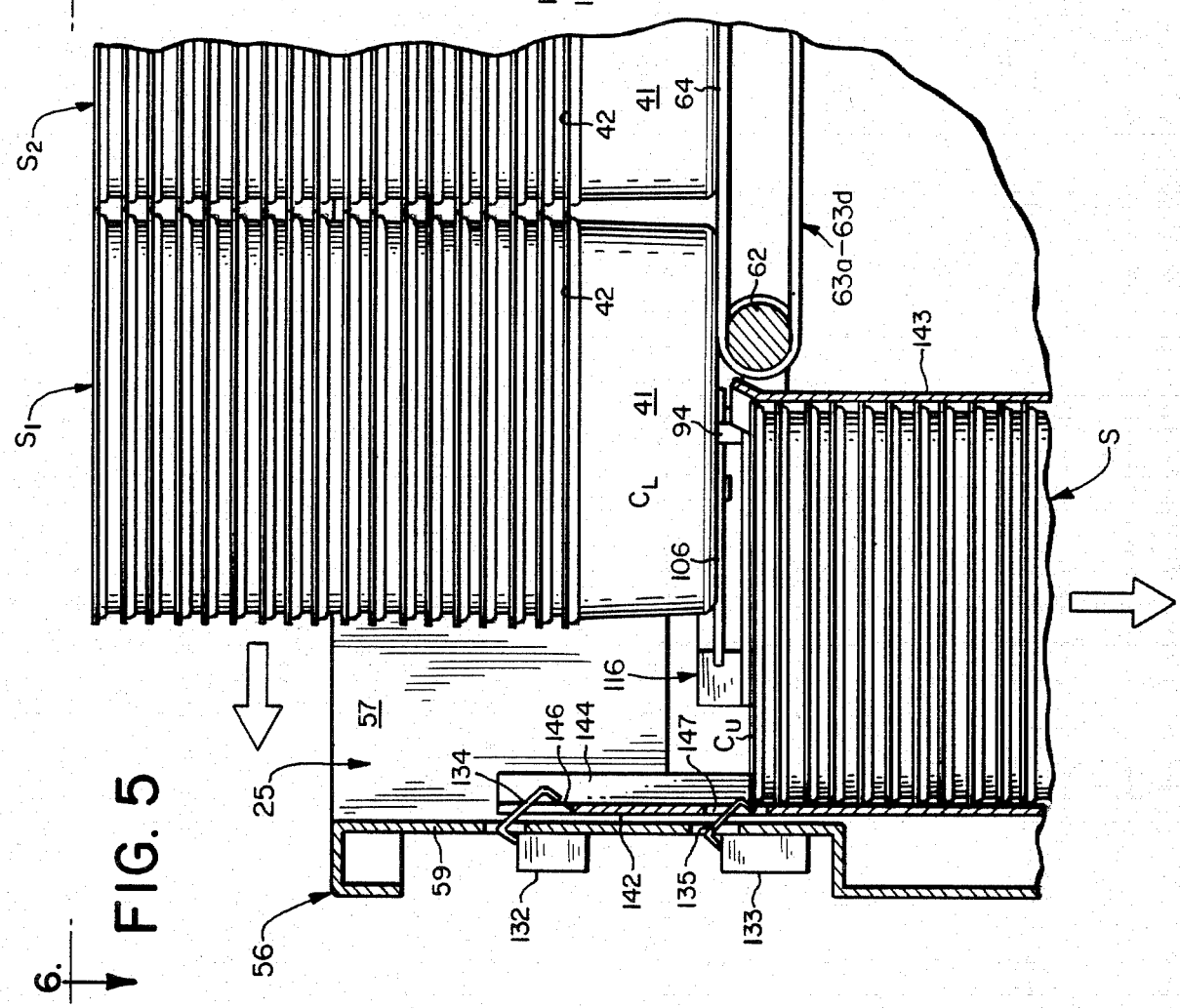

APPARATUS FOR SEPARATING NESTED CUP-SHAPED CONTAINERS

BACKGROUND OF THE INVENTION (1) Field of the Invention

This invention relates to an apparatus for separating nested articles, and more particularly relates to an apparatus for continuously separating one or more stacks of nested, cup-shaped containers.

(2) Description of the Prior Art

Machines or apparatus have been heretofore developed for separating nested, cup-shaped items, such as metal or plastic containers, from a stack thereof to permit the individual containers to be filled with food products, or the like, for subsequent closure and protection by a lid. Examples of apparatus capable of performing the aforementioned separating function are disclosed in the Mueller U.S. Pat. No. 4,054,212, Medendorp U.S. Pat. No. 3,843,019, Crabtree U.S. Pat. No. 3,283,955 and Frederick et al U.S. Pat. No. 3,379,346.

In order to maintain continuous operation, many of the de-nesting apparatus heretofore advanced employed feed mechanisms for feeding additional stacks of nested containers into the separating mechanism prior to or upon depletion of a previously supplied stack. Examples of feed mechanisms for intermittently feeding stacks of nested containers to a separating mechanism are disclosed in the Girande U.S. Pat. No. 3,591,041, Rockola U.S. Pat. No. 3,771,691, Olsen U.S. Pat. No. 1,881,894 and Kopera U.S. Pat. No. 3,347,413.

While the aforementioned prior art container separating and feed mechanisms were capable of performing their intended functions, they were not entirely satisfactory for various reasons, such as complexity of construction and lack of reliability in operation. These and other considerations, rendered the aforementioned prior art devices unsuitable for use in applications where it is necessary to continually supply individual containers to a point of use, such as a food product dispensing machine, over long periods of time and without human supervision.

SUMMARY OF THE INVENTION

The present invention contemplates an improved apparatus for receiving a plurality of stacks of nested containers and sequentially separating the containers in each stack so that individual containers are continuously supplied to a point of use, such as a food product dispensing machine. Specifically, the apparatus of the present invention includes a separating mechanism for rapidly and reliably separating a stack of nested, cup-shaped containers, each of which has a lip around the rim at the upper end thereof, and a feed mechanism for receiving a plurality of stacks of the nested containers and automatically supplying additional stacks to the separating mechanism prior to depletion of the stack being separated.

The separating mechanism, to be hereinafter described in detail, includes guide means for receiving and retaining a stack of the nested containers in vertically extending relation. The separating mechanism also includes finger means positioned intermediate the length of the guide means and movable into engagement with the lip of the lowermost container of the stack in the guide means to separate the container from the stack. The finger means thus includes at least one pair of oppositely arranged, substantially horizontally extending holding fingers disposed on laterally opposite sides of the stack in the guide means, and at least one pair of oppositely arranged, substantially horizontally extending stripping fingers, also disposed on laterally opposite sides of the stack in the guide means, and transversely spaced from the holding fingers. The inner ends of the stripping fingers engage the lip of the lowermost container of the stack and serve to shift the container downwardly and off of the stack.

A pair of pivotally mounted holding shoes are likewise disposed on laterally opposite sides of the lowermost container of the stack in the guide means and are positioned below the holding fingers. The holding shoes are movable between positions engaging the lip of the lowermost container of the stack so as to support the same when the holding and stripping fingers are disengaged therefrom, and positions spaced from the stack.

The separating mechanism further includes actuating means for effecting synchronized, cyclic movement of the holding and stripping fingers, as well as the holding shoes, so that the containers in the stack in the guide means are separated at predetermined intervals. Such actuating means includes a pair of rotatably mounted, horizontally extending, cam shafts which are laterally spaced from the guide means and on which the outer ends of the holding and stripping fingers are eccentrically mounted. Followers on the holding and stripping fingers, as well as on the pivotally mounted shoes, engage cams on the cam shafts and effect pivotal movement of the stripping fingers and pivotal movement of the holding shoes between their operative and inoperative positions.

Separation of the lowermost container from the stack in the guide means is assisted by nozzles which direct jets of air toward the lip of the lowermost container in the stack as the latter is shifted downwardly by the stripping fingers.

The apparatus of the present invention also includes a feed mechanism for supplying stacks of nested containers to the separating mechanism before the stack in the guide means of the separating mechanism is depleted. The feed mechanism thus includes means defining a path for receiving a plurality of stacks of nested containers, arranged one behind the other, and conveyor means for moving the stacks of containers toward the separating mechanism. A staging station is defined at the end of the path of the feed mechanism, adjacent to the separating mechanism, for retaining a stack of containers in readiness for movement into the guide means of the separating mechanism, and means is provided for effecting movement of the stack of containers on the staging station over the upper end of the guide means, prior to depletion of the stack therein, so that the stack drops into the guide means or channel of the separating mechanism.

In the embodiment of the feed mechanism described herein, the staging station is provided by downstream portions of the upper runs of the endless belts of the conveyor means, and the means for effecting movement of a stack of containers on the staging station over the upper end of the guide means includes a pair of upstanding buttons, which are movable between positions extending into the path so as to engage and prevent movement of the stack on the staging station and positions spaced from the path so as to permit movement of the stack off of the staging station. The buttons are carried on the ends of a pair of laterally spaced, pivotally mounted levers, which shift the buttons between their aforementioned positions.

The feed mechanism also includes a pair of laterally spaced, horizontally extending, plate-like gates, which are shiftable between positions bridging over the upper end of the guide means and retracted positions permitting a stack that has moved onto the gates to drop into the guide means. The ends of the pivotally mounted levers, opposite from the ends on which the buttons are carried, are disposed in slots in the gates so that extension and retraction of the gates effects simultaneous movement of the levers. A laterally spaced pair of cylinder assemblies having extensible and retractable plungers are connected to the gates and serve to effect rapid movement thereof between their extended and retracted positions. A pair of vertically spaced sensing switches are mounted in the guide means and serve to selectively communicate the ends of the cylinder assemblies with a source of fluid under pressure when the stack of containers in the guide means is nearing depletion.

BRIEF DESCRIPTION OF THE DRAWINGS

FIG. 3 is a broken, fragmentary vertical sectional view, with portions thereof in elevation, taken substantially along the line 3—3 of FIG. 2;

FIG. 4 is a view similar to FIG. 3 but showing the parts of the feed mechanism in the positions they would occupy immediately prior to advancement of another stack of containers over the upper end of the vertical guide channel of the separating mechanism;

FIG. 5 is a view similar to FIG. 4 but showing the positions of the parts of the feed mechanism when a stack of containers to be separated has partially advanced over the upper end of the channel of the separating mechanism;

FIG. 8 is a vertical sectional view, similar to FIG. 5, but showing the parts of the feed and separating mechanisms as they would appear immediately after a new stack of containers has fully entered and descended in the channel of the separating mechanism;

FIGS. 12a-15a, inclusive, are a series of enlarged, fragmentary sectional views showing additional details of the eccentric mounting of the outer ends of the holding and stripping fingers of the separating mechanism illustrated in FIGS. 7-10, inclusive, and also showing the manner in which the cams coact with the followers of the fingers to effect the separating action of the mechanism through a cycle of operation.

GENERAL DESCRIPTION

Figure 1:
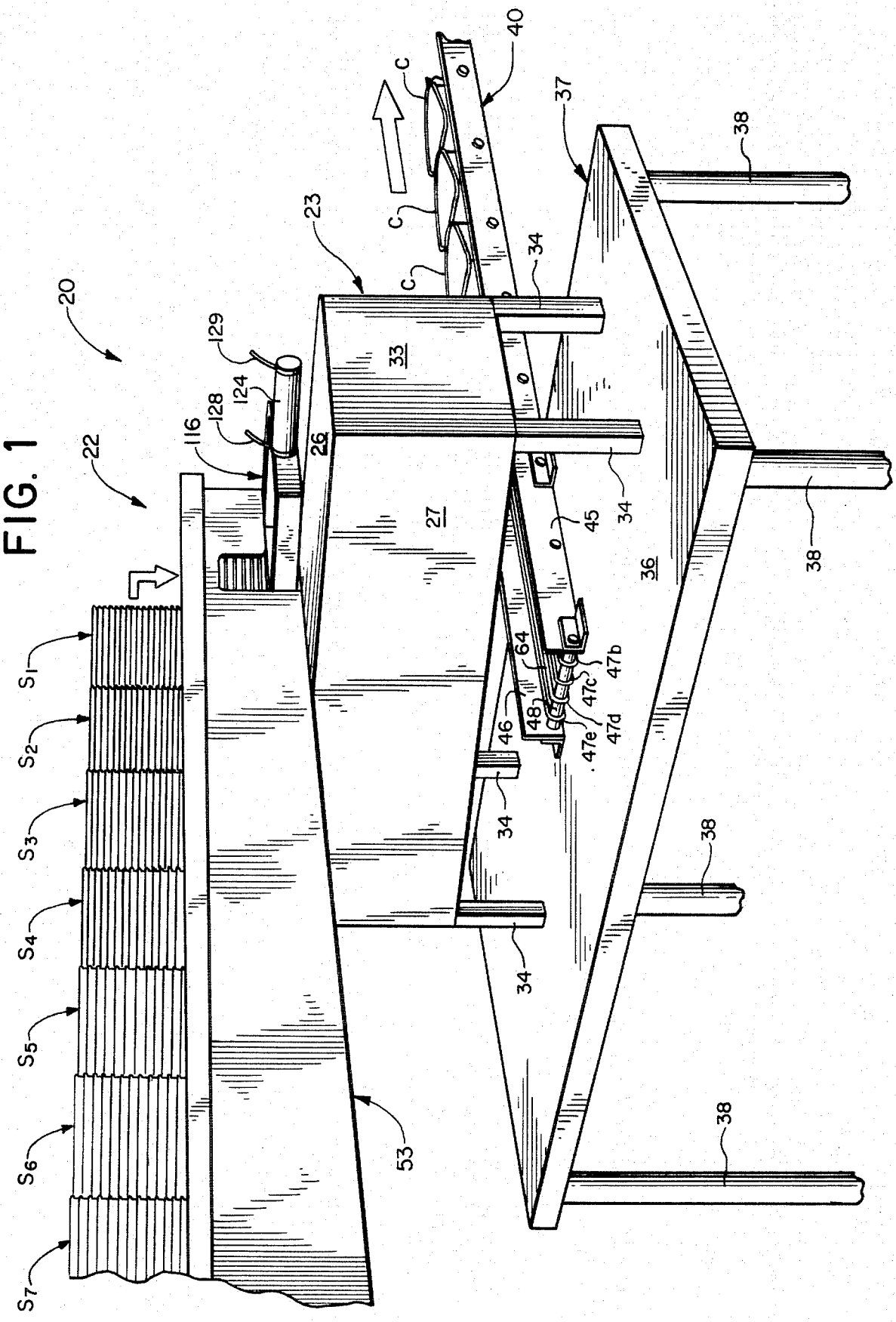
FIG. 1 is a perspective view of an apparatus embodying the features of the present invention, which utilizes a separating mechanism to continuously separate nested, cup-shaped containers from a stack thereof, and a feed mechanism to receive and retain a plurality of stacks of the containers and sequentially supply the same to the separating mechanism.

Referring initially to FIG. 1, an apparatus for separating nested, cup-shaped containers from one or more stacks thereof is illustrated and described generally at 20. The apparatus 20, which embodies the features of the present invention, generally comprises a feed mechanism, indicated generally at 22, and a separating mechanism that is enclosed by a rectangular housing 23. The separating mechanism is indicated generally at 24 in FIG. 9 and includes vertically extending guide means defining a channel, indicated generally at 25, for supporting and guiding movement of a stack of containers while the latter descends into and is separated by the separating mechanism 24.

Figure 9:
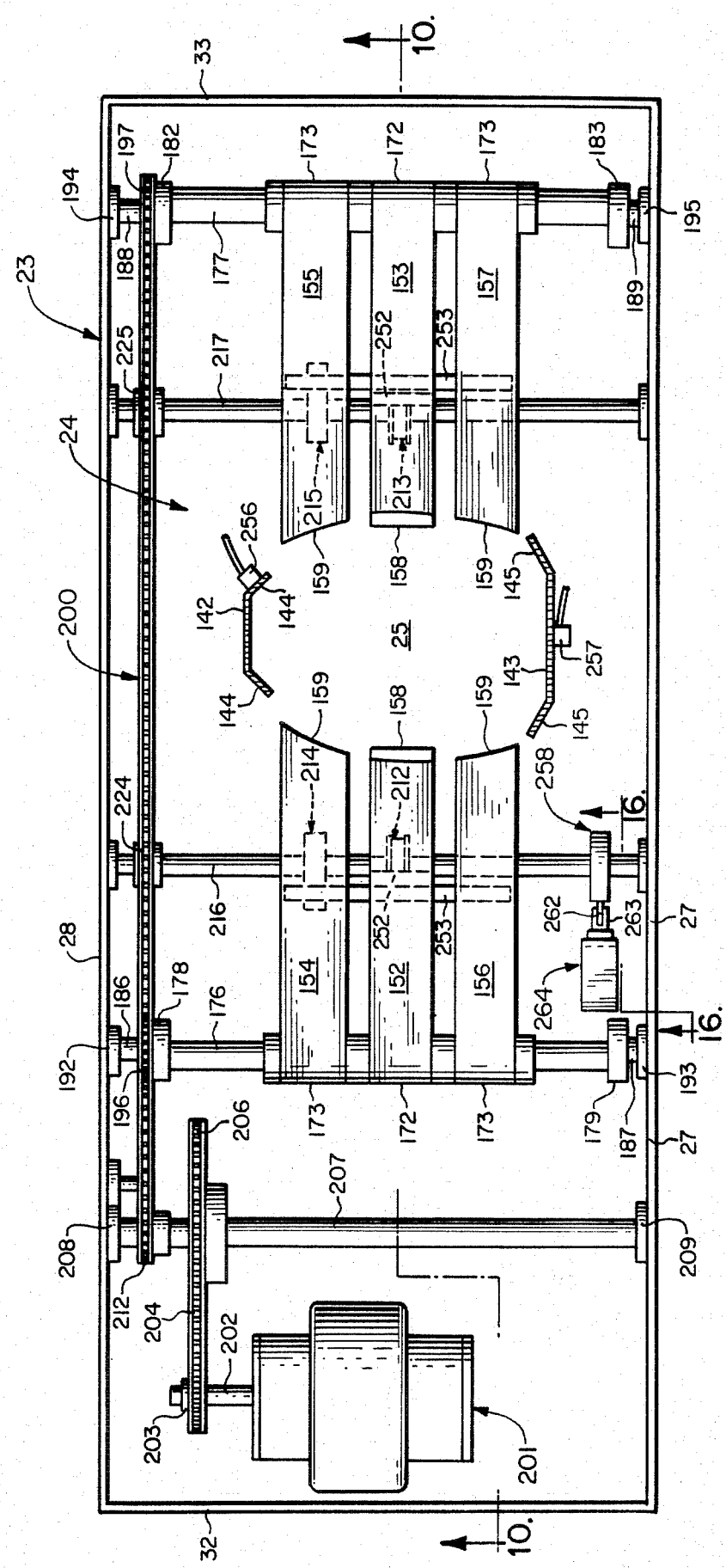
FIG. 9 is a plan view of the separating mechanism of the apparatus illustrated in FIG. 1 but with the feed mechanism removed to show the details of the separating mechanism.

As shown in FIGS. 1 and 9, the housing 23 has a flat upper surface 26, vertically extending front and rear walls 27 and 28, respectively, and left and right side walls 32 and 33, respectively. The housing 23 also includes four legs 34, which support the housing on the upper surface, indicated at 36, of a table 37. The table 37 has four legs 38 for supporting the same on the floor or some other horizontal support surface.

Figure 2:
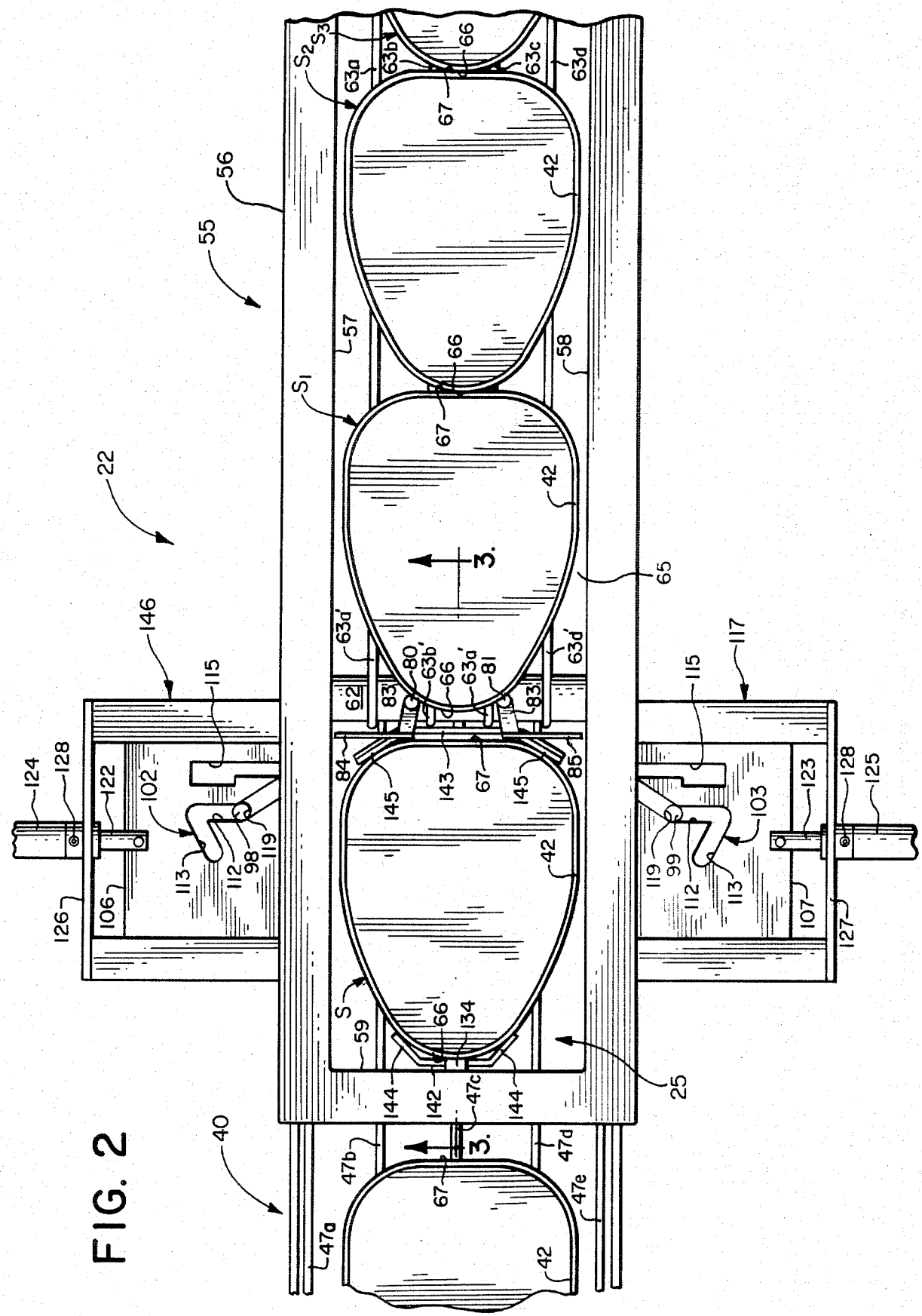
FIG. 2 is an enlarged, fragmentary plan view of the downstream end of the feed mechanism of the invention and showing the positions of the parts thereof when a stack of containers is being separated by the separating mechanism.
Figure 6:
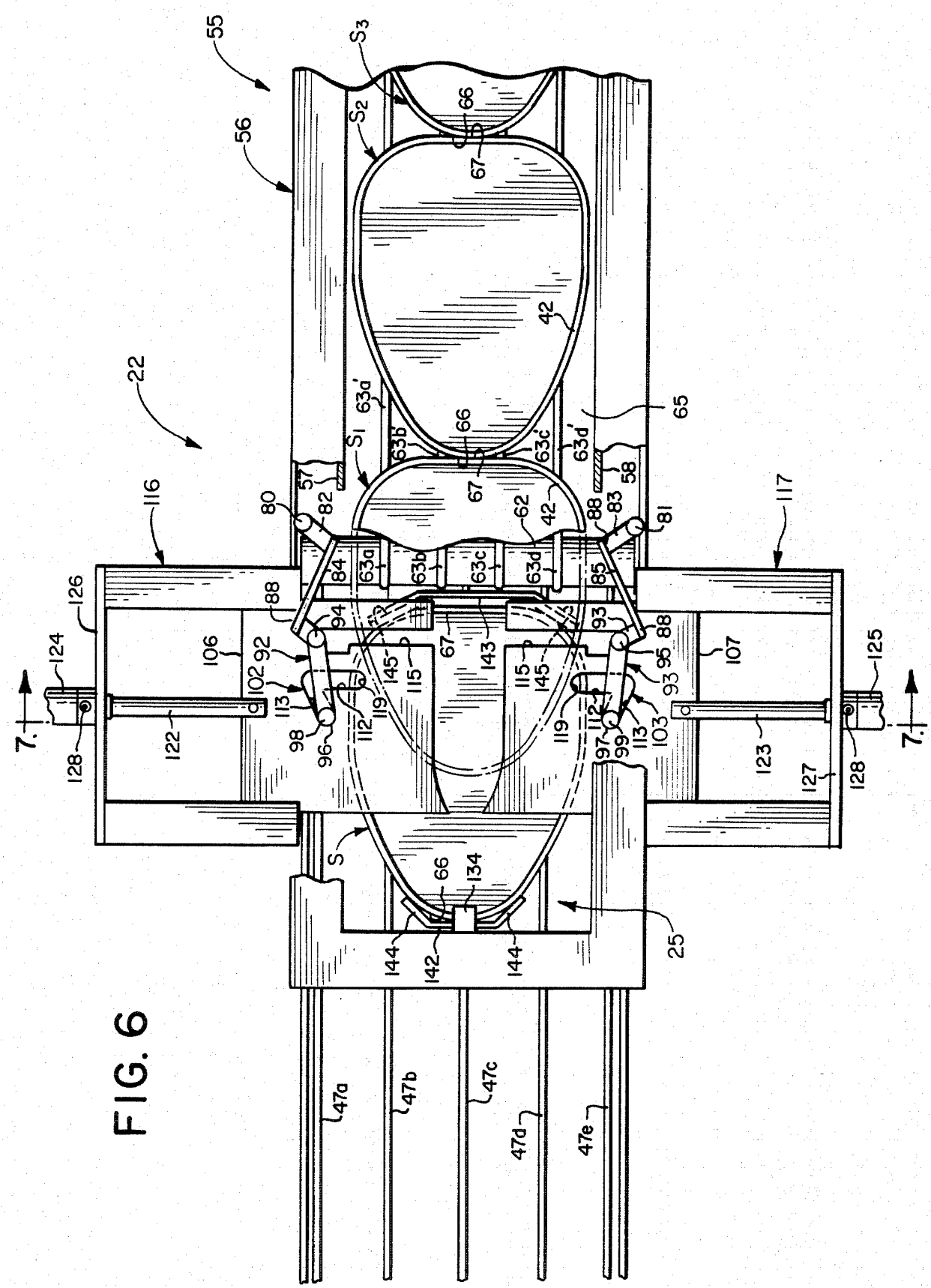
FIG. 6 is an enlarged, fragmentary top plan view, similar to FIG. 2 but with portions broken away to show underlying details, taken substantially along the line 6—6 of FIG. 5.

A take-away conveyor, indicated generally at 40 in FIGS. 1, 2 and 6, is provided for receiving cup-shaped containers or cans C that have been separated from a stack thereof by the separating mechanism 24 and transporting the same to a point of use remote from the apparatus 20, such as a meat food product filling machine (not shown). Three cup-shaped containers of the type with which the apparatus 20 is adapted for use are shown on the take-away conveyor 40 and respectively indicated at C. The sidewalls of the containers C, indicated at 41, are tapered so that the containers will nest within each other when arranged in a stack. In addition, each container C has an outwardly projecting lip 42 around the periphery of the rim thereof.

The take-away conveyor 40, in the present instance, includes a laterally spaced pair of elongated, horizontally extending, upright plates 45 and 46 which are secured to the upper surface 36 of the table 37 so as to underlie the separating mechanism 24 and extend perpendicularly therefrom. A plurality of longitudinally spaced, transversely extending shafts, are rotatably mounted at spaced intervals between the plates 45 and 46, the upstream one of which is indicated at 48 in FIG. 1. A plurality of laterally spaced, endless belts, five of which are indicated at 47a-47e, respectively, in FIGS. 2 and 6, extend around the shafts of the take-away conveyor 40. Each of the transverse shafts is provided with a plurality of circumferentially extending grooves (not shown) for respectively receiving the belts 47a-47e and maintaining an equidistant lateral spacing therebetween.

Drive means, such as a pneumatic motor (not shown), may be mounted at the downstream end of the take-away conveyor 40 and connected to the downstream roller thereof to effect movement of the belts 47a-47e in a direction to cause the upper runs thereof, indicated at 52 in FIG. 1, to move away from the table 37. Consequently, containers separated by the mechanism 24 and deposited on the belts 47a-47e are transported to the downstream end of the take-away conveyor 40 and thence to a point of use such as the aforementioned meat food product filling machine.

The details of the construction and operation of the apparatus 20 will now be described.

THE FEED MECHANISM 22

Figure 7:
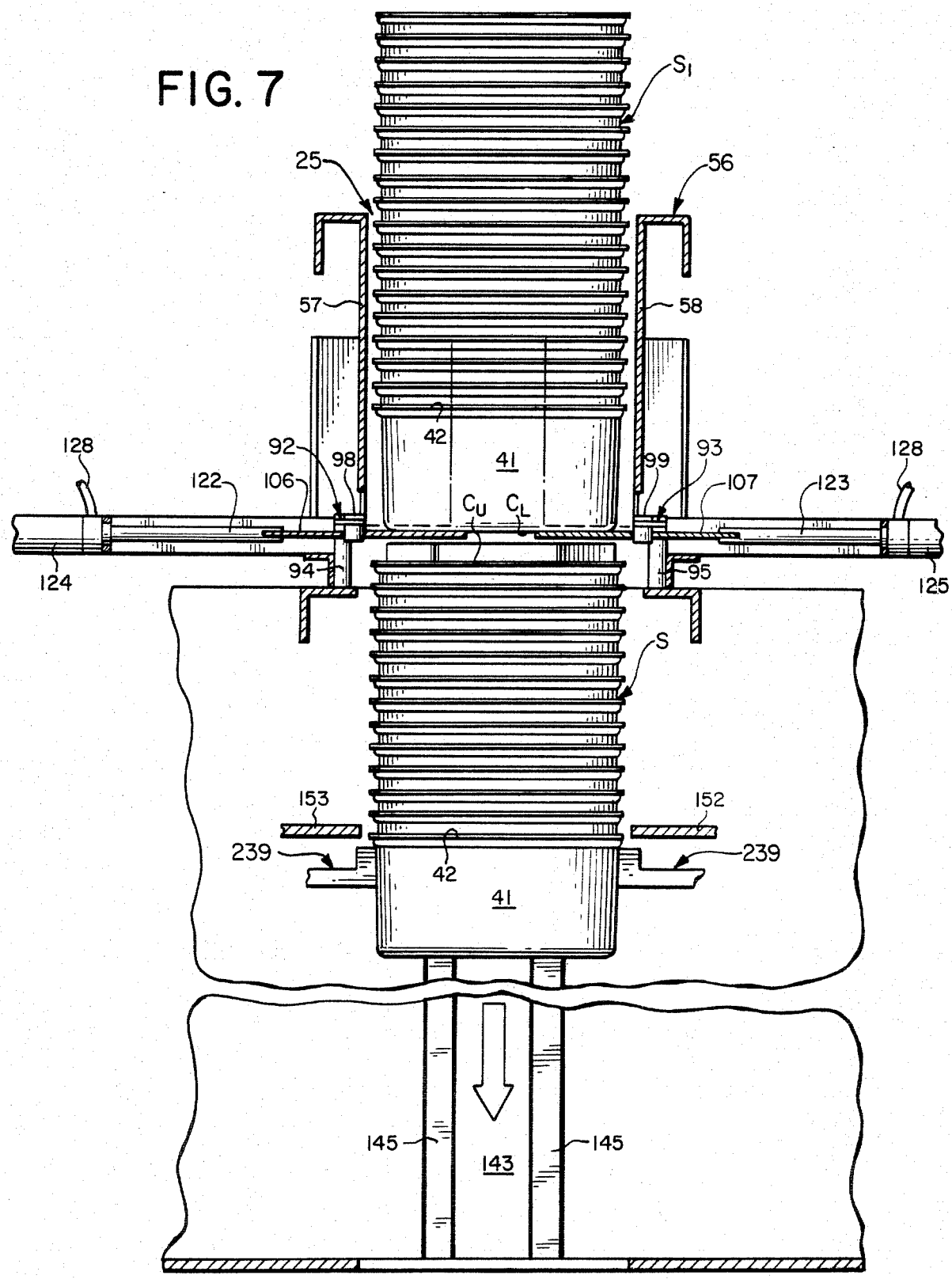
FIG. 7 is a sectional view, with some parts in elevation, taken substantially along the line 7—7 of FIG. 6.

Referring initially to FIGS. 2 and 6 in conjunction with FIG. 1, it will be seen that the feed mechanism 22 comprises means in the form of an in-feed conveyor 55 defining a path for receiving, retaining and transporting a plurality of stacks of containers to be separated. A plurality of such stacks are shown on the in-feed conveyor 55 and respectively indicated at $S_1$-$S_7$ in FIG. 1. The in-feed conveyor 55 is in the form of a narrow, elongated, U-shaped housing 56 having a pair of elongated, laterally spaced, upstanding side walls 57 and 58, and a connecting transverse end wall 59. As best seen in FIGS. 6 and 7, the upper ends of the side walls 57 and 58, and end wall 59 are bent into channels.

The in-feed conveyor 55 also includes a plurality of longitudinally spaced rollers which extend transversely between and are rotatably mounted in the side walls 57 and 58 of the housing 56. The farthest downstream roller of the in-feed conveyor 55 is indicated at 62 in FIGS. 2 and 6 and is spaced upstream from the end wall 59 by an amount somewhat greater than the length of a container C. A plurality of endless belts, respectively indicated at 63a-63d, extend lengthwise between the side walls 57 and 58 and are received in grooves in the rollers, which maintain the lateral spacing between the belts. Drive means in the form of a pneumatic motor (not shown) may be connected to an intermediate one of the rollers 62 so as to cause the upper runs, indicated at 64 in FIGS. 3, 5 and 8, of the belts 63a-63d to move in unison toward the end wall 59 when the motor is operating. Thus, when the drive motor of the in-feed conveyor 55 is running, stacks of containers placed on the belts 63a-63d will be transported therealong and toward a staging station, indicated at 65 in FIGS. 2 and 6, and by the position of the stack of containers $S_1$ in FIG. 2. The staging station 65 is provided by downstream portions, indicated at 63a'-63d' in FIGS. 2 and 6, of the upper runs 64 of the belts 63a-63d. When the apparatus 20 is in operation, the drive motor for the in-feed conveyor 55 operates continuously so that stacks of containers loaded onto the conveyor 55 are carried forwardly thereon until the arcuate, leading ends, indicated at 66, and the flat, trailing ends, indicated at 67, of the respective stacks abut each other, as illustrated by the positions of the stacks of containers $S_1$-$S_7$ in FIG. 1 and $S_1$-$S_3$ in FIGS. 2 and 6.

According to the present invention, the in-feed conveyor 55 includes means for effecting movement of a stack of containers on the staging station 65 over the upper end of the channel 25 to permit the stack to descend in the channel by gravity. Such means is best seen in FIG. 6 and includes at least one and preferably a laterally spaced pair of upstanding stop members or buttons 80 and 81, which are movable between positions extending into the path of the in-feed conveyor 55 and positions spaced from said path. To this end, the buttons 80 and 81 are respectively carried at the outer ends of a pair of arms 82 and 83, the inner ends of the arms 82 and 83 being secured to the lower ends of a pair of upright, generally rectangular, plate-like members or doors 84 and 85. The doors 84 and 85 are respectively carried at one of the ends, indicated at 88, of a pair of bent levers 92 and 93, which are mounted for pivotal movement on upstanding posts 94 and 95 secured to support structure for the conveyor 55. The opposite ends, indicated at 96 and 97, of the levers 92 and 93 are provided with disk-like followers 98 and 99 which engage cam means in the form of a pair of generally V-shaped slots 102 and 103 formed in a pair of generally rectangular, horizontally extending, plate-like members or gates 106 and 107. Each of the slots 102 and 103 includes a laterally extending portion 112 and a portion 113 which extends forwardly and rearwardly from the outer end of the portion 112.

The gates 106 and 107 are mounted in generally U-shaped frames 116 and 117 for laterally shiftable movement between extended, bridging positions extending into the channel 25 and providing a support surface therein that is substantially coextensive with the upper runs 64 of the belts 63a-63d, and between retracted positions spaced laterally outwardly from the channel 25. To this end, the frames 116 and 117 extend laterally outwardly from the conveyor housing 56 in general vertical alignment with the upper runs 64 of the conveyor belts 63a-63d. Such relationship is best seen in FIGS. 4 and 5.

Thus, the stop members or buttons 80 and 81 will engage portions of the side wall 41 of the lowermost container of the stack on the staging station 65, adjacent to the arcuate, leading end portion 66, when the shiftable gates 106 and 107 are in their retracted positions illustrated in FIG. 2. When the gates are so retracted, the followers 98 and 99 are positioned at the inner ends, indicated at 119, of the laterally extending portions 112 of the V-shaped slots 102 and 103, respectively. A pair of laterally extending slots 115 are provided in the gates 106 and 107 to accommodate the pivot posts 94 as the gates shift laterally inwardly and outwardly relative thereto.

Movement of the gates 106 and 107 between their retracted and extended positions illustrated in FIGS. 2 and 6, respectively, is effected by actuating means in the form of a pair of extensible and retractable plungers 122 and 123. Thus, the outer ends of the plungers 122 and 123 are connected to the laterally outer edges of the gates 106 and 107 and the inner ends of the plungers are connected to pistons (not shown) in a pair of pneumatic cylinder assemblies 124 and 125. The axially inner ends of the cylinder assemblies 124 and 125 are mounted in openings in plates 126 and 127 at the laterally outer ends of the U-shaped support frames 116 and 117, respectively. Fluid conduits, indicated at 128 and 129 are connected to the inner and outer ends, respectively, of the cylinder assemblies 124 and 125 and serve to alternately supply fluid under pressure to and vent fluid under pressure from the inner and outer ends of the cylinder assemblies in order to effect extension and retraction of the plungers 122 and 123.

According to the present invention, the apparatus 20 includes control means for controlling the flow of fluid under pressure to and venting of the conduits 128 and 129, as well as controlling the flow of fluid under pressure to the motors of the feed and separating mechanisms 22 and 24. Such control means includes a fluid circuit (not shown) having an electric motor driven pump (also not shown) comprising a source of fluid under pressure for the various components of the apparatus 20.

In this regard, compressed air is the preferred fluid for actuating the various components of the apparatus 20. Consequently, the driving, driven and position sensing components of the apparatus 20, to be hereinafter described, are of the pneumatic type. It should be understood, however, that either an electrical or hydraulic type control circuit and components could be used in the apparatus 20, instead of the disclosed pneumatic type.

The fluid circuit of the apparatus 20 thus includes a first control member or pneumatic switch 132 (FIGS. 3, 4, 5 and 8), mounted on the transverse end wall 59 of the housing 56 adjacent to the upper end of the channel 25, and a second control member or pneumatic switch 133, which is likewise mounted on the transverse end wall 59 below the switch 132 and in general horizontal alignment with the upper runs 64 of the in-feed conveyor belts 63a–63d. The switches 132 and 133 include movable tripping members or levers 134 and 135, respectively, which extend through openings in the end wall 59 and the structure that defines the channel 25 so that the levers will be contacted by and shifted to different positions when a stack of containers is present in and completely fills the channel 25, as illustrated in FIGS. 2 and 8.

The arrangement of the switches 132 and 133 in the fluid circuit of the apparatus 20 is such that when the tripping lever 134 of the switch 132 is pivoted toward the wall 59 by a stack of containers in the channel 25, the switch 132 will cause air under pressure to be supplied to the conduits 128 of the cylinder assemblies 124 and 125. Consequently, the plungers 122 and 123 retract and shift the gates 106 and 107 to their retracted positions illustrated in FIG. 2. At this time the conduits 129 are vented to the atmosphere.

The switch 133 performs the opposite function in that, when the lever 135 thereof shifts into the channel 25, due to the absence of a stack of containers in the channel, as illustrated in FIG. 5, the switch 133 will cause air under pressure to be supplied to the conduits 129 of the cylinder assemblies 124 and 125. Consequently, the plungers 122 and 123 will extend and shift the gates 106 and 107 to their closed or bridging positions illustrated in FIG. 6. At this time, the conduits 128 are vented to the atmosphere. Thus, the switches 132 and 133 perform a sequencing function in that they prevent a stack of containers on the staging station 65 from being shifted into the channel 25 until the uppermost container in the stack that is being separated by the separating mechanism 24 moves out of contact with the tripping lever 135 of the switch 133.

OPERATION OF THE FEED MECHANISM 22

Assuming that the apparatus 20 is in operation and that a plurality of stacks of containers to be separated, such as the stacks $S_1$–$S_7$ are present in the housing 56 and oriented therein in the positions illustrated in FIGS. 2 and 6, i.e. with the arcuate ends 66 thereof all facing in the same direction and toward the end wall 59 of the housing 56, and further assuming that a stack S of nested containers is present in the channel 25 of the separating mechanism 24, so that the tripping levers 134 and 135 of the pneumatic switches 132 and 133 are shifted to their positions illustrated in FIG. 8, the shiftable gate members 106 and 107 will be in their retracted positions illustrated in FIG. 2. The gates 106 and 107 are held in their retracted positions at this time since the pneumatic circuit of the apparatus is supplying air under pressure to the conduits 128 of the cylinder assemblies 124 and 125.

When the gates 106 and 107 are in their retracted positions illustrated in FIG. 2, the followers 98 and 99 on the ends of the levers 92 and 93 will be positioned in the laterally inner ends 119 of the portions 112 of the slots 102 and 103, as shown in FIG. 2. Consequently, the upstanding buttons 80 and 81 on the ends of the arms 82 and 83 will be disposed in the path of movement of the containers in the conveyor housing 56 so that the buttons 80 and 81 will engage portions of the side wall 41 of the lowermost container of the stack on the staging station 65, adjacent to the arcuate leading end portion 66 thereof, as illustrated in FIG. 2. Consequently, the stack $S_1$ of containers on the staging station 65 will be prevented from advancing into the channel 25 of the separating mechanism 24.

Since the pneumatic motor of the in-feed conveyor 55 continues to run while the apparatus 20 is in operation, the belts 63a–63d thereof will transport any other stacks of containers on the conveyor 55 toward the stack on the staging station 65 until portions of the outwardly projecting lips 42 of the containers in each stack adjacent to the leading and trailing ends 66 and 67 thereof, respectively, engage each other in the manner illustrated in FIGS. 2 and 6.

As the stack S of containers in the channel 25 of the separating mechanism 24 becomes shorter, due to separation of containers from the lower end of the stack, the uppermost container, indicated at $C_U$ in FIGS. 3 and 4, moves below the tripping lever 134 of the pneumatic switch 132. The tripping lever 134 then swings inwardly into the channel 25, as illustrated in FIG. 4. However, the associated fluid circuit will not, at this time, cut off the supply of air under pressure to the conduits 128 of the cylinder assemblies 124 and 125. Consequently, the plungers 122 and 123, as well as the gates 106 and 107, remain in their retracted positions illustrated in FIG. 2. The stack of containers S in the channel 25 thus continues to move downwardly in the channel with each cycle of operation of the separating mechanism.

As the stack of containers S continues to move down in the channel 25, the outwardly projecting lip 42 of the uppermost container $C_U$ of the stack moves below the tripping lever 135 of the pneumatic switch 133, as illustrated in FIG. 5. When this occurs, the control circuit of the apparatus 20 connects the conduits 128 to the atmosphere and causes fluid under pressure to be supplied to the conduits 129. The plungers 122 and 123 thus immediately extend and the gates 106 and 107 simultaneously move to their extended or bridging positions illustrated in FIG. 6.

As the gates 106 and 107 move from their retracted positions illustrated in FIG. 2 to their extended or bridging positions illustrated in FIG. 6, the levers 92 and 93 pivot about the posts 94 and 95, respectively, from the positions thereof illustrated in FIG. 2 to the positions thereof illustrated in FIG. 6. This is due to the cam action of the V-shaped slots 102 and 103 on the followers 98 and 99 at the ends of the levers 92 and 93, the followers 98 and 99 being positioned in the slots 102 and 103. Movement of the gates 106 and 107 and, consequently, pivotal movement of the levers 92 and 93, takes place quite rapidly so that the buttons 80 and 81 are clear of the path of movement of containers in the in-feed conveyor 55 substantially simultaneously with movement of the tripping lever 135 of the pneumatic switch 133 from the position thereof illustrated in FIGS. 3 and 4 to the position thereof illustrated in FIG. 5.

Since the belts 63a–63d of the in-feed conveyor 55 are running while the apparatus 20 is in operation, as soon as the stop buttons 80 and 81 swing laterally outwardly away from their points of engagement with the side wall 41 of the lowermost container in the stack $S_1$, all of the stacks on the in-feed conveyor move forwardly, in unison, toward the end wall 59, as illustrated in FIGS. 5 and 7. Since the gates 106 and 107 are in their extended or bridging positions illustrated in FIG. 6 at this time, the stack $S_1$ moves off of the staging station 65 and onto the gates 106 and 107. Such movement continues until the outwardly projecting lips 42 on one or more of the lowermost containers of the stack $S_1$ engage the tripping lever 134 of the pneumatic switch 132 and shift the lever to the position thereof illustrated in FIGS. 2 and 8. When this occurs, the associated fluid control circuit again reverses the connections of the conduits 128 and 129 so that compressed air is supplied to the conduits 128 and the conduits 129 are vented to the atmosphere. Consequently, the plungers 122 and 123 immediately retract, as do the gates 106 and 107. Such movement occurs substantially simultaneously with movement of the tripping lever 134 from the extended position thereof illustrated in FIGS. 4 and 5 to the forwardly swung position thereof illustrated in FIG. 8.

Retraction of the gates 106 and 107 permits the stack of containers $S_1$ to drop into the channel 25 so that the lowermost container $C_L$ of the stack $S_1$ drops into the uppermost container $C_U$ of the stack S. Thus, the stack of containers $S_1$ is added to the stack S in the channel 25, as illustrated in FIG. 8.

The speed of retracting movement of the gates 106 and 107 is such as to cause the buttons 80 and 81 on the arms 82 to move into engagement with the side wall 41 of the next stack of containers $S_2$ and hold the stack $S_2$ on the staging station 65 until the uppermost container $C_U$ of the stack $S_1$ in the channel moves out of engagement with the tripping lever 135 of the pneumatic switch 133. The associated pneumatic circuit will then repeat the previously described cycle of operation of the feed mechanism 22.

It should be noted that, during a cycle of operation of the feed mechanism 22, the buttons 80 and 81 serve the important function of maintaining the stack of containers on the staging station 65 spaced from the stack or stacks of containers in the channel 25 of the separating mechanism 24. If such spacing were not maintained, the portions of the outwardly projecting lips 42 at the leading ends 66 of the stack of containers on the in-feed conveyor 55 would contact the portions of the outwardly projecting lips at the trailing ends 67 of the stack of containers in the channel 25 and possibly prevent the stack from descending in the channel.

THE SEPARATING MECHANISM 24

As heretofore mentioned, the separating mechanism 24 includes the vertically extending guide means or channel 25 for supporting and guiding movement of a stack of containers while the stack descends into and is separated by the separating mechanism 24. The channel 25 thus preferably comprises a longitudinally spaced pair of vertically extending, substantially channel-shaped guide members 142 and 143 (FIGS. 2 and 6). The guide member 142 is secured to the inner wall 59 of the conveyor housing 56 and has laterally outwardly and rearwardly diverging flanges 144 which are adapted to engage portions of the outwardly projecting lips 42 of the stack of containers in the channel 25, adjacent to the arcuate, leading ends 66 thereof.

The guide member 143 is supported in an upright position closely adjacent to the downstream end of the staging station 65 by structure not shown and has laterally outwardly and forwardly diverging flanges 145 which are adapted to engage laterally spaced portions of the outwardly projecting lips 42 of the stack of containers S in the channel 25, adjacent to the flat trailing ends 67 thereof, as shown in FIG. 2. Thus, the guide members 142 and 143 maintain a stack of containers in proper longitudinally and laterally spaced relation as the stack descends in the channel 25 during a separating operation. The guide member 142 is provided with a cut-out 146 in the upper end thereof to permit the tripping lever 134 to extend therethrough, and an opening 147 is provided in the guide member 142 below the cut-out 146 to permit the tripping lever 135 to extend therethrough. Corresponding openings 148 and 149 are provided in the wall 59 of the housing 56.

The swingable doors 84 and 85, form extensions of the guide member 144 and serve to support a stack of containers in the channel 25 when the doors are in their retracted positions illustrated in FIGS. 2, 3, 4 and 8.

Figure 10:
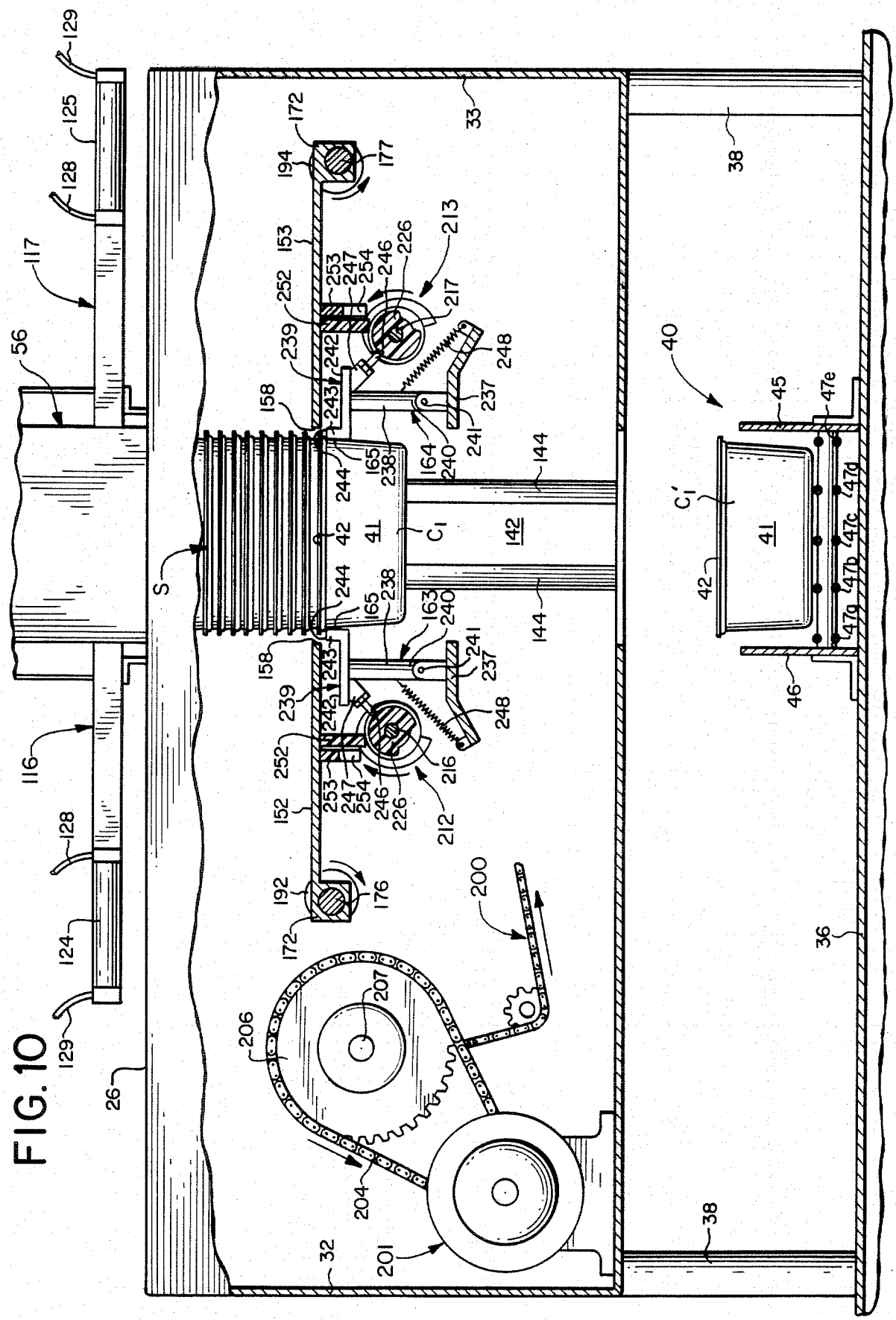
FIG. 10 is a vertical sectional view, taken substantially along the line 10—10 of FIG. 9, but with a stack of containers in the channel of the separating mechanism.

Referring now to FIGS. 9 and 10, it will be seen that the separating mechanism 24 comprises finger means in the form of a plurality of elongated, substantially horizontally extending, oppositely arranged pairs of fingers, there being at least one oppositely arranged pair of holding fingers 152 and 153 and at least one and preferably two pair of oppositely arranged stripping fingers 154,155 and 156,157, the pairs of stripping fingers 154,155 and 156,157 being disposed on laterally opposite sides of the holding fingers 152 and 153 and being transversely spaced therefrom, as viewed in FIG. 9. The inner ends of the holding fingers 122 and 123 are indicated at 158, and the inner ends of the two pairs of stripping fingers 154,155 and 156,157, are indicated at 159.

The separating mechanism 24 also includes holding means in the form of a pair of pivotally mounted, oppositely arranged holding shoes (FIG. 10) for supporting a stack of containers, such as the stack $S_1$ when the pairs of stripping and holding fingers 154,155; 156,157, and 152,153, respectively, are disengaged from the stack. The inner ends of the holding shoes 163 and 164 are indicated at 165 in FIG. 10.

While the fingers 152–157 can be of different materials and shapes, they are preferably of metal and in the form of flat bars. In this regard, the laterally outer ends of the holding fingers 152 and 153 are enlarged to provide bearing bosses, indicated at 172, and the laterally outer ends of the pairs of stripping fingers 154,155 and 156,157, are likewise enlarged to provide bearing bosses, indicated at 173. As best seen in FIG. 10, the outer ends of the bosses 172 of the holding fingers 152 and 153 are transversely bored to receive the journals of a pair of shafts 176 and 177 therethrough. The bosses 173 of the pairs of stripping fingers 154,155 and 156,157, are likewise bored to receive the journals of the shafts 176 and 177 therethrough.

As best seen in FIG. 9, the ends of the shafts 176 and 177 include eccentric hubs 178,179 and 182,183, respectively, from which stub shafts 186,187 and 188,189 respectively extend, the stub shafts 186,187 and 188,189 being supported in bearing assemblies 192,193 and 194,195, respectively, secured to the front and rear walls 27 and 28 of the housing 24.

In order to effect eccentric rotation of the shafts 176 and 177 in opposite directions, the hubs 178 and 182 thereof include sprockets 196 and 197, the teeth of which are meshed with an endless chain 200, driven by a pneumatic motor 201. To this end, the motor 201 has an output shaft 202, to which a drive sprocket 203 is secured. A chain 204 meshes with the teeth of the drive sprocket 203 and with a larger, driven sprocket 206 secured to a transversely extending idler shaft 207, which is rotatably supported at its ends in bearing assemblies 208 and 209 carried by the rear and front walls, respectively, of the housing 24. A smaller sprocket 211 is also mounted on the idler shaft 207, the chain 200 being meshed with the sprocket 211 and driven thereby.

As previously mentioned, the shafts 176 and 177 are eccentrically mounted in the hubs 178,179 and 182,183, respectively. Consequently, rotation of the shafts 176 and 177 will effect reciprocating movement of the holding fingers 152 and 153 as well as reciprocating movement of the pairs of stripping fingers 154,155 and 156,157. In addition to such reciprocating movement, the separating mechanism 24 includes cam means for effecting pivotal movement of the pairs of stripping fingers 154,155 and 156,157 between their substantially horizontal positions illustrated in FIG. 10 and downwardly inclined positions approximately indicated at 154′ and 155′ in FIG. 15. In order to effect the aforementioned downwardly inclined movement of the inner ends, indicated at 159, of the pairs of fingers 154,155 and 156,157 during a cycle of operation of the separating mechanism 24, the aforementioned cam means includes a pair of composite cams 212 and 213 and a pair of single cams 214 and 215.

As will be apparent from FIGS. 9 and 10, the composite cam 212 and single cam 214, and the composite cam 213 and single cam 215 are respectively mounted on laterally extending shafts 216 and 217, the outer ends of which are supported in bearing assemblies 218,219 and 222,223, respectively, in the rear and front walls 28 and 27 of the housing 24. Sprockets 224 and 225 (FIG. 9) on the shafts 216 and 217 are meshed with the chain 200 and serve to rotate the shafts 216 and 217 in opposite directions when the separating mechanism is in operation. Since the composite cam 213 and single cam 215 are of the same construction as the composite cam 212 and single cam 214, only the composite cam 212 and single cam 214 will be described in detail hereinafter.

Figure 11:
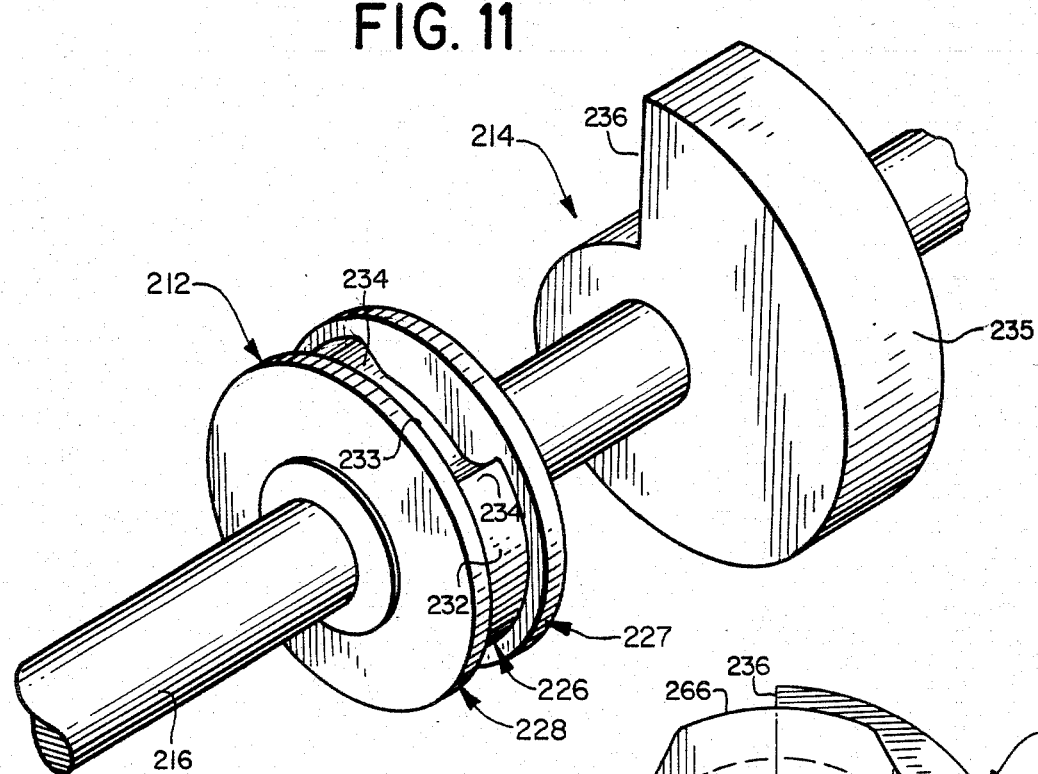
FIG. 11 is an enlarged, fragmentary perspective view of two of the cams employed in the separating mechanism of the apparatus.

Referring now to FIG. 11 in conjunction with FIGS. 9 and 10, it will be seen that the composite cam 212 includes a central cam section 226 and a pair of adjacent, integral cylindrical sections 227 and 228. The central cam section 226 controls movement of the holding shoe 163 and the adjacent, cylindrical sections 227 and 228 control movement of the holding finger 152. As will be apparent from FIGS. 10 and 11, the central cam section 226 includes a working portion 232, a recessed base circle portion 233 of approximately 60° duration and inclined ramp portions 234 which connect the working portion 232 with the base circle portion 233. The diameters of the cylindrical cam sections 227,228 are somewhat greater than the diameter of the working portion 232 so that the adjacent inner side faces of cam sections 227,228 provide guides for the follower of the cam section 226.

As will be apparent from FIGS. 9 and 11, the cam 214 is axially spaced from the composite cam 212 and is of a "jump-type". The cam 214 thus includes a spiral or working portion 235 of continuously varying radius, and a connecting, radially extending ramp portion 236. The duration of the working portion 235 is substantially 360°.

As best seen in FIG. 10, each of the holding shoes 163 and 164 is elongated and includes a generally vertically extending or upright section 238 (FIG. 10) having upper and lower end portions 239 and 240, respectively. Each holding shoe is mounted for pivotal movement about a horizontal axis by a pin 241 which extends through the lower end portion 240 and support structure, indicated at 237, of the apparatus 20 so that the holding shoes 163 and 164 are positioned between their respective cams 212,214 and 213,215 and the lowermost container of the stack in the channel 66. The upper end portion 239 of each shoe is generally L-shaped and is arranged so that the longer leg of the L, indicated at 242, extends perpendicularly to the upright section 238 and generally horizontally inwardly toward the lowermost container in the stack. The shorter leg of the L is indicated at 243 and extends upwardly from the horizontal leg 242 and forms the inner end 165 of each shoe. The upper end, indicated at 244, of each shorter leg 243 is adapted to engage the underside of the lip 42 of the lowermost container when the holding shoes are pivoted into engagement therewith.

Each of the holding shoes 163 and 164 has a follower in the form of a stem 246 that is threaded into the outer end of a boss 247, the latter being carried on the undersides of the horizontally extending legs 242 of respective ones of the holding shoes 163 and 164. The bosses 247 extend downwardly and outwardly toward the composite cams 212 and 213 so that the stems 246 of the holding shoes engage and ride on the central sections 226 of their respective composite cams 212 and 213, as shown in FIG. 10. The outer ends of the stems 246 may be rounded, and a spring 248 serves to maintain contact between the ends of the stems 246 and the central sections 226 of the cams 212 and 213.

Each of the holding fingers 152 and 153 is likewise provided with a follower in the form of a nylon block 252 on the undersides thereof, the blocks 252 riding on the cylindrical cam sections 227 and 228 of the composite cams 212 and 213 and being out of contact with the central cam sections 226 thereof.

Since the cam sections 227 and 228 are cylindrical, rotation of the cams 212 and 213 will not result in any significant vertical movement of the fingers 152 and 153, as viewed in FIG. 10, during each revolution of the cams 212 and 213. However, the ends 158 of the fingers 152 and 153 will experience a slight amount of vertical movement due to the eccentric movement of the bearing bosses 172 at the laterally outer ends of the fingers.

In order to assure substantially identical positioning and movement of the inner ends 159 of the transversely spaced pairs of the stripping fingers 154,156 and 155,157, elongated, transversely extending connecting members in the form of nylon blocks 253 are secured to the undersides of these pairs of fingers for engaging the cams 214 and 215. Each of the blocks 253 includes a depending portion 254 which engages a respective one of the cams 214 and 215 and serves as a follower. The followers 252 of the holding fingers 152 and 153 and the followers 254 of the pairs of stripping fingers 154,156 and 155,157 are biased into engagement with their respective cams 212,213 and 214,215 by springs, not shown.

The manner in which the holding shoes 163,164, holding fingers 152,153 and stripping fingers 154,155 and 156,157 coact to strip containers from a stack in the channel 25 of the apparatus 20 will now be described.

OPERATION OF THE SEPARATING MECHANISM 24

Figure 12:
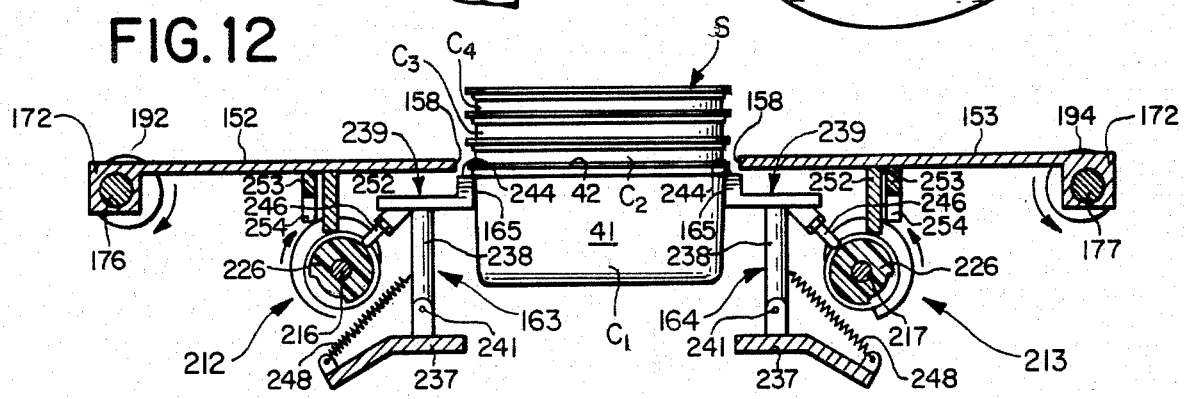
FIGS. 12-15, inclusive, are a series of semi-diagrammatic vertical sectional views showing the positions of the parts of the separating mechanism during one complete cycle of operation thereof.

For the purposes of understanding a typical cycle of operation of the separating mechanism 24, it will be assumed that the apparatus 20 is operating and that a stack of containers, such as the stack S, is descending in the channel 25 of the separating mechanism 24. It will also be assumed that the parts of the separating mechanism 24 are in the positions illustrated in FIGS. 10 and 12. Thus, the inner ends 158 of the holding fingers 152,153 and the inner ends 159 of the pairs of stripping fingers 154,155 and 156,157 will be retracted from the channel 25. The inner ends 165 of the upper portions 239 of the holding shoes 163 and 164 and the upper ends 244 of the legs 243 thereof will, however, be engaged with the sidewall 41 and outwardly extending, peripheral lip 42 of the lowermost container $C_1$ of the stack S so that the stack is retained in the approximate positions thereof shown in FIGS. 10 and 12. For simplification of illustration, only four containers are shown in the stack S in FIG. 12.

As the chain 200 (FIG. 9) effects clockwise rotation of the shafts 176 and 216 and counterclockwise rotation of the shafts 177 and 217, the holding fingers 152 and 153 will shift inwardly toward the stack of containers S due to the eccentric mounting of the shafts 176 and 177. Such movement continues until the inner ends 158 of the holding fingers 152 and 153 engage the sidewall 118 of the container, indicated at $C_2$, above the lowermost container $C_1$ being held by the holding shoes 163 and 164, as is illustrated in FIG. 13. The position of the cams 212 when the holding fingers 152 and 153 are positioned as illustrated in FIG. 13, is shown in greater detail in FIG. 13a.

Figure 13A:
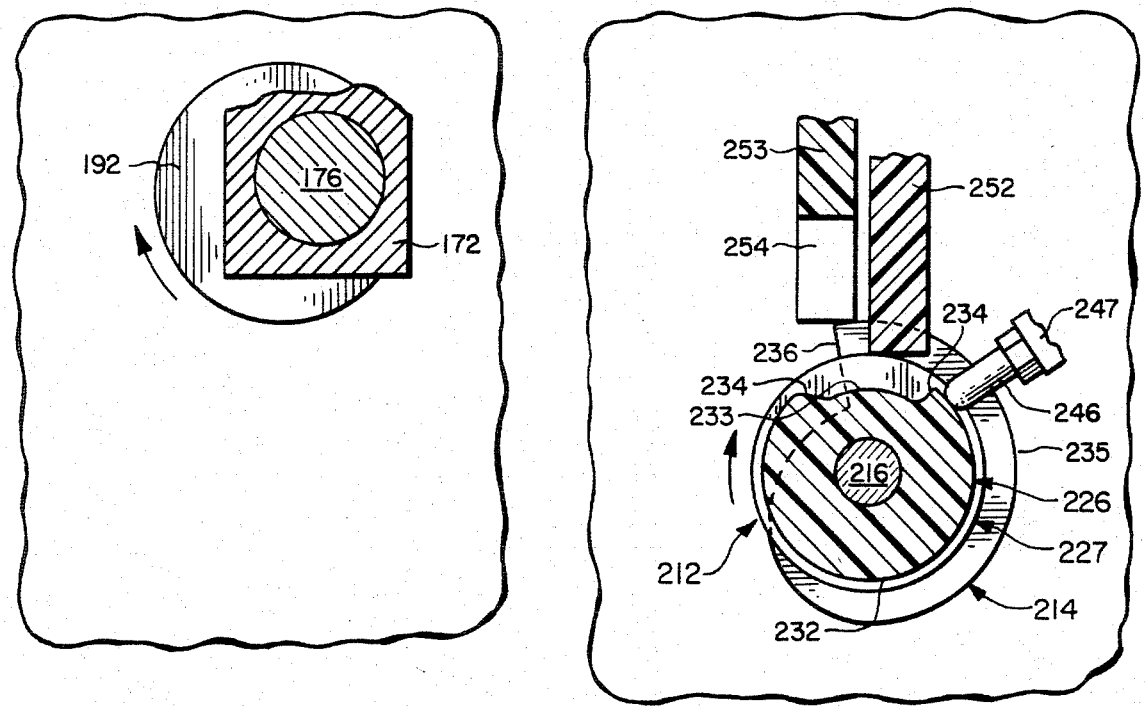
Figure 13:
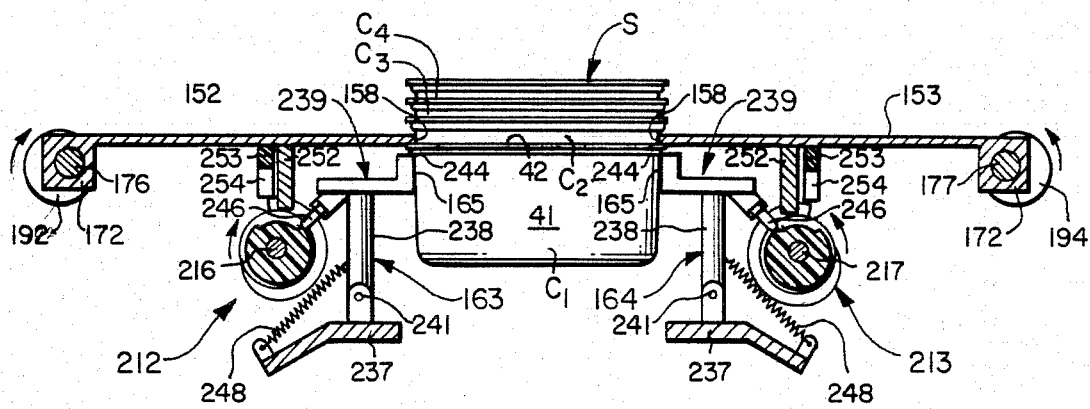

Thus, as shown in FIG. 13a, the follower 246 of the holding shoe 163 is about to move off of the working portion 232 of the cam section 226 and onto the base circle portion 233 thereof. The follower 252 of the holding finger 152 is in contact with the cylindrical sections 227 and 228 of the composite cam 212, and the follower 254 for the stripping fingers 154 and 156 is approaching the radial ramp portion 236 of the "jump" cam 214. Consequently, the inner ends 159 of the pair of stripping fingers 4,156 and 155,157 are substantially coplanar with the inner end 8 of the holding finger 152. The inner ends 159 of the stripping fingers 155,157 and the inner end 158 of the holding finger 153 are in the same relative positions.

Since the inner ends 158 of the holding fingers 152 and 153, and the inner ends 159 of the stripping fingers 154,155 and 156,157 have moved under the lip 42 of the container $C_2$, these fingers are now capable of supporting the container $C_2$ and the remainder of the containers in the stack S thereabove. Only the containers $C_3$ and $C_4$ of the stack S are shown in FIG. 13, in addition to the container $C_2$.

Figure 14:
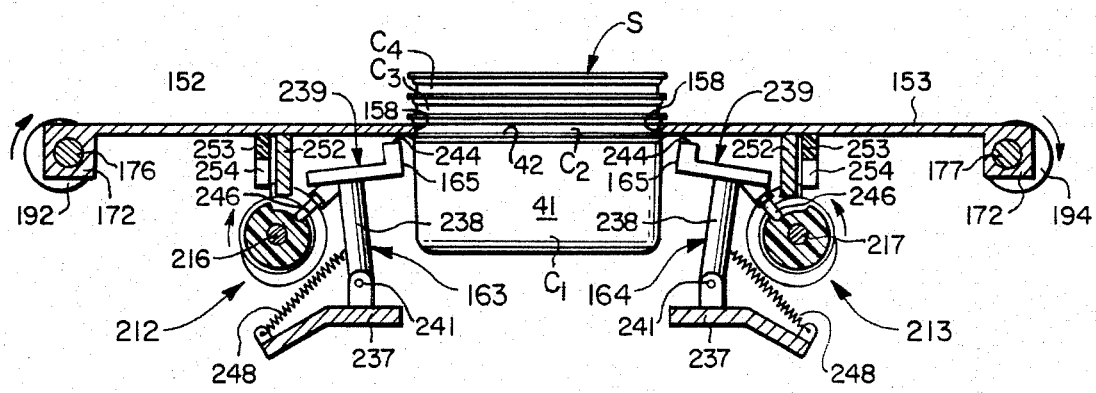
Figure 14A:
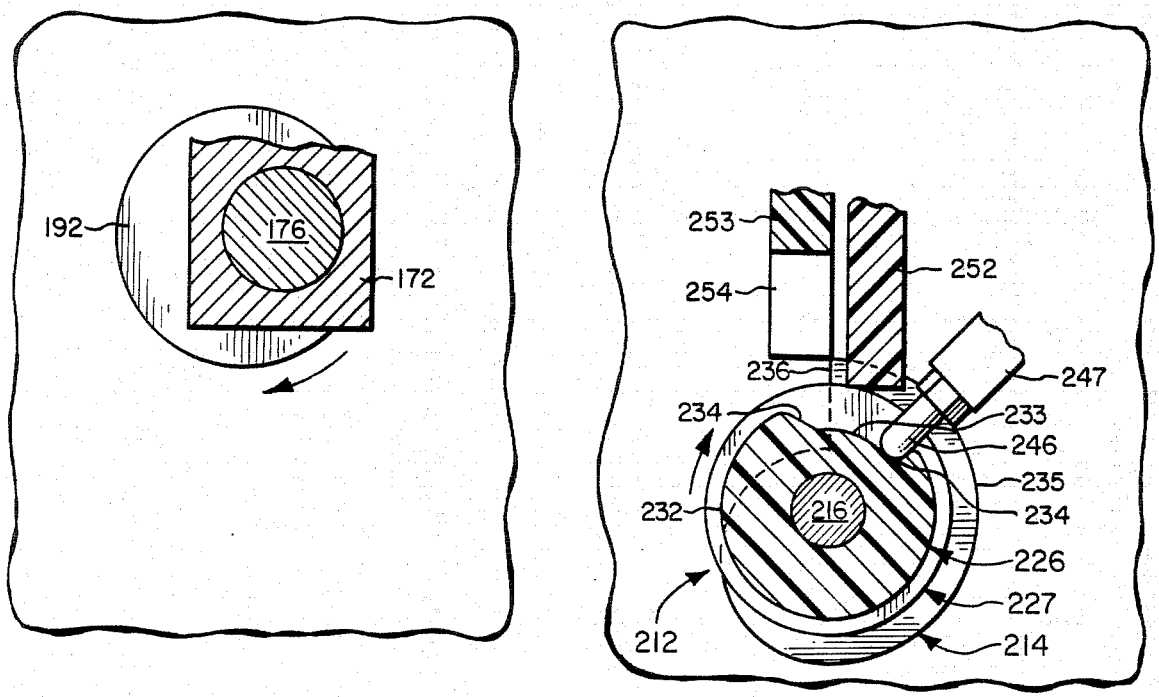

Continued clockwise rotation of the shafts 176 and 216, and counterclockwise rotation of the shafts 177 and 217 from the positions thereof illustrated in FIGS. 13 and 13a to the positions thereof illustrated in FIGS. 14 and 14a results in the follower 246 of the holding shoe 163 moving off of the working portion 232 of the cam section 226 and onto the base circle portion 233 thereof. Thus, the springs 248 will cause the holding shoes 163 and 164 to pivot about their mounting pins 241 and the inner ends 165 of the upper end portion 239 thereof to move away from the lowermost container $C_1$ so that the latter is unsupported. The followers 254 for the pairs of stripping fingers 154,156 and 155,157 have not, however, moved off of the high points of the cams 214 and 215, but are just about to do so.

Figure 15:
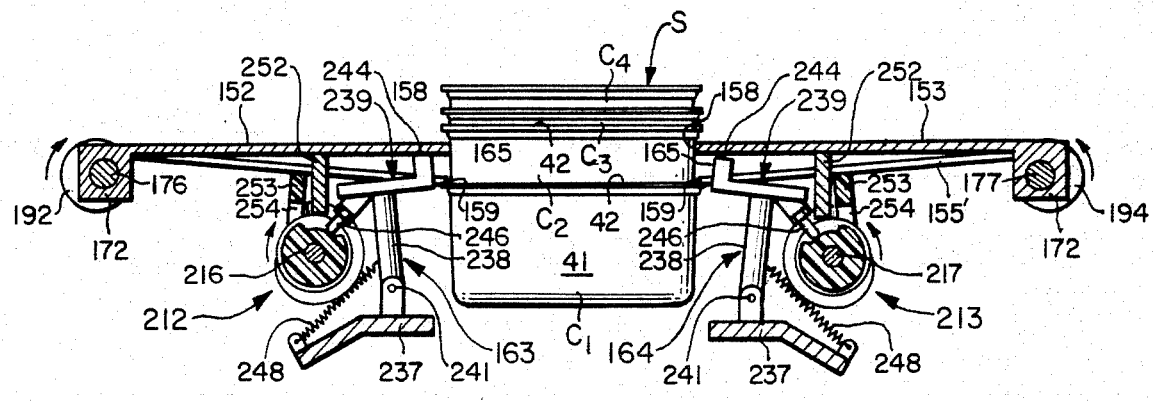
Figure 15A:
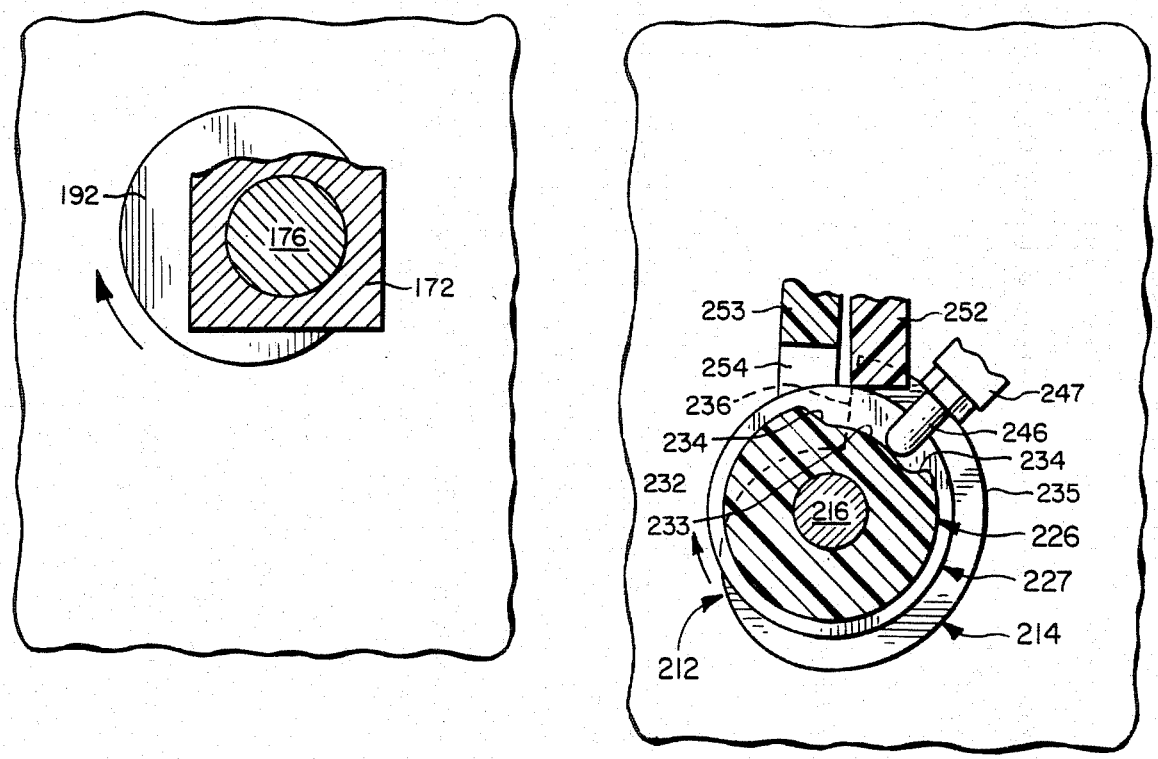

Additional incremental clockwise and counterclockwise movement of the shafts 216 and 217 causes the followers 254 to move off of the working portions 235 of the cams 214 and 215 and into engagement with minimum radius portions of these cams, as illustrated in FIGS. 15 and 15a. Such movement of the followers 254 results in downward pivotal movement of the ends 159 of the pairs of stripping fingers 154,156 and 155,157 to the positions of the stripping fingers illustrated at 154' and 155' in FIG. 15. Since the inner ends 159 of the stripping fingers 154,155 and 156, 157 overlap the lip 41 of the container $C_1$, this container is caused to shift downwardly with respect to the container $C_2$, and the remaining containers in the stack S. The extent of downward movement of the ends 159 of the pairs of stripping fingers 154,155 and 156,157 is in the order of about one inch. Such movement is normally sufficient to separate the lowermost container $C_1$ from its frictional engagement with the container $C_2$ thereabove so that the container $C_1$ drops away from the stack and onto the underlying take-away conveyor 40, as illustrated by the position of the container $C_1'$ in FIG. 10.

In order to assist disengagement of the lowermost container in the stack being separated, such as the container $C_1$, from the next container $C_2$ thereabove, means in the form of at least one and preferably a pair of nozzles 256 and 257 are provided for directing jets of fluid under pressure, specifically, compressed air, between the lips 42 of the lowermost container $C_1$ and the container $C_2$ thereabove during the separating cycle. To this end, the nozzles 256 and 257 are preferably arranged at opposite ends of the stack S of containers and, as shown in FIG. 9. Specifically, the nozzle 256 is secured to the upright guide member 142 and the nozzle 257 is secured to the upright guide member 143.

Figure 16:
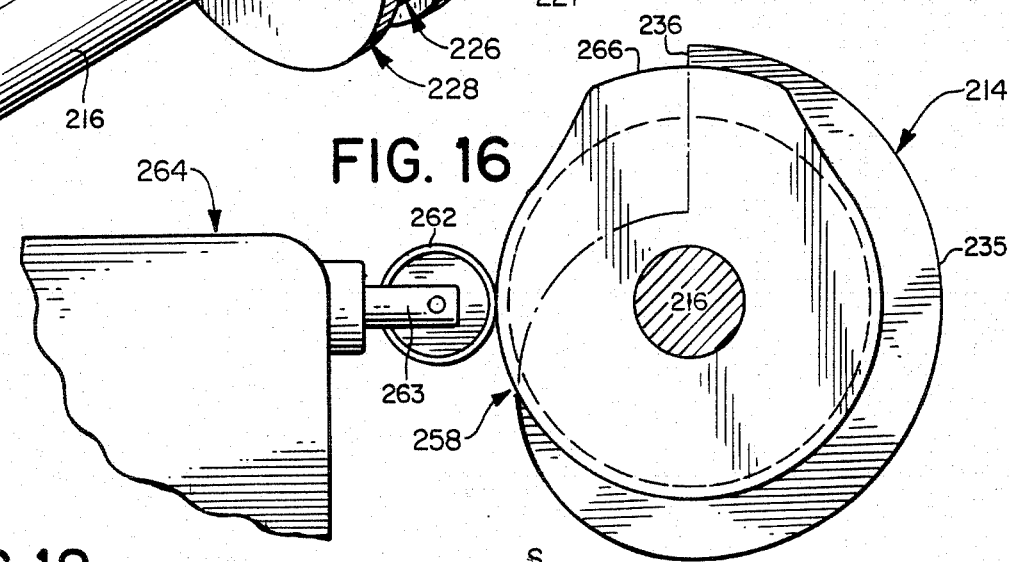
FIG. 16 is an enlarged, fragmentary, vertical sectional view taken substantially along the line 16—16 of FIG. 9.

Operation of the nozzles 256 and 257 to emit jets of air in the space between the lips 110 of the containers $C_1$ and $C_2$ is controlled by a cam 258 (FIGS. 9 and 16), which may be mounted on the shaft 216 for rotation therewith. The cam 258 engages a roller 262 on the outer end of the shiftable plunger 263 of a pneumatic switch 264, the switch 264 being operable when actuated to cause the associated pneumatic control circuit to supply air under pressure to the nozzles 256 and 257. This occurs shortly before the roller 262 moves onto the working portion, indicated at 266, of the cam 258, and shortly before the followers 254 of the pairs of stripping fingers 154,156 and 155,157 move off of the high points of their respective cams 214 and 215.

Continued clockwise rotation of the shafts 176 and 216 and counterclockwise rotation of the shafts 177 and 217 from the positions thereof illustrated in FIGS. 15 and 15a will result in upward movement of the followers 254 and consequently upward pivotal movement of the ends 159 of the stripping fingers 154,156 and 155,157 from the positions thereof indicated at 154' and 155' in FIG. 15 toward the positions thereof illustrated in FIG. 14.

Figure 12A:
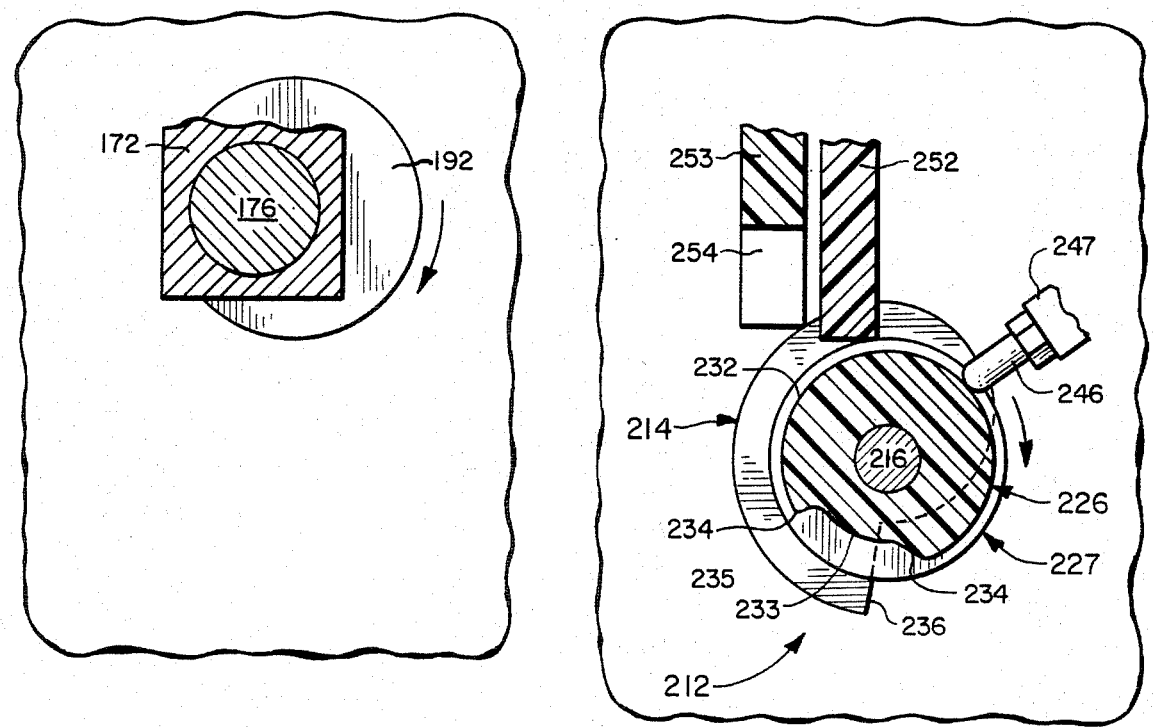

After something less than 180° of rotation of the shafts 216 and 217 from the positions thereof illustrated in FIGS. 15 and 15a, the followers 254 will have moved onto the maximum lift portions of the cams 214 and 215 so that the fingers 154,156 and 155,157 are in substantially the same positions as they were in FIG. 14, i.e. they will be substantially coplanar with the holding fingers 152 and 153 and will underlie the lip 42 of the container $C_2$, which is now the lowermost container in the stack S. Thereafter, additional rotation of the shafts 216 and 217 will result in the followers 246 of the holding shoes 163 and 164 moving onto the working portions 232 of the cam sections 226, as approximately illustrated in FIGS. 12 and 12a. The ends 165 of the holding shoes 163 and 164 will thus move into engagement with the sides 41 of the container $C_2$, which is now the lowermost container in the stack to complete the separation cycle. Thus, the lowermost container of the stack in the channel 25 of the separating mechanism 24 will be separated for each revolution of the shafts 176,216 and 177,217, at the approximate rate of one container per second.

From the foregoing description, it will now be appreciated that the apparatus 20 is capable of rapidly, reliably and automatically separating containers from a plurality of stacks thereof in which the containers in each stack are either loosely or tightly nested together, and delivering the separated containers to a point of use, such as a food product filling machine. The apparatus 20 makes it unnecessary for an operator of the machine to place his or her hands in the interiors of the containers prior to, during or after separation. Consequently, the possibilities of contaminating the containers prior to filling is that much less. In addition, the construction of the feed and separating mechanisms 22 and 24 of the apparatus 20 substantially reduces the possibility of injury to an operator of the apparatus.

In the foregoing description, the apparatus 20 has been described in connection with stacks of the containers C, which are generally oval in plan. It should be understood, however, that the apparatus 20 could also be used to separate stacks of nested, cup-shaped containers having shapes different from that of the containers C, in plan, such as circular or rectangular.

While one or more embodiments of the invention have been herein illustrated and described, it will be understood that modifications and variations thereof may be developed which do not depart from the spirit of the invention and the scope of the appended claims.

I claim:

1. Apparatus for continuously separating cup-shaped containers from a plurality of stacks thereof in which the containers in each stack are arranged in upwardly opening, nested relation, said apparatus comprising, in combination, a separating mechanism for separating the containers of a stack supplied thereto and a feed mechanism for supplying additional stacks of containers to said separating mechanism prior to or upon depletion of a stack being separated, said separating mechanism including vertically extending guide means for supporting a stack of containers to be separated in vertically extending relation, said guide means having an upper end through which a stack of containers to be separated descends, finger means movable into and out of engagement with the containers of the stack in said guide means and operable to separate said containers, one at a time, from the bottom of said stack, and at least one holding shoe disposed below said finger means and operable to support the stack of containers in said guide means while said finger means is disengaged from said stack, said feed mechanism including means defining a path for receiving and retaining a plurality of unpackaged stacks of said containers, adjacent ones of said stacks being in contact with one another and one end of said path terminating at a staging station adjacent to the upper end of said guide means, conveyor means for advancing stacks of containers on said path toward and onto said staging station, and shiftable means for effecting movement of a stack of containers on said staging station over the upper end of said guide means prior to or upon depletion of a stack being separated, said shiftable means comprising means for holding the stack of containers in the staging station out of contact with the stack being separated;

said shiftable means operating intermittently in response to depletion of the stack of containers being separated, and the conveyor means operating continuously to push said plurality of stacks of containers along said path toward said staging station.

2. Apparatus for continuously separating cup-shaped containers from a plurality of stacks thereof in which the containers in each stack are arranged in upwardly opening, nested relation, said apparatus comprising, in combination, a separating mechanism for separating the containers of a stack supplied thereto and a feed mechanism for supplying additional stacks of containers to said separating mechanism prior to or upon depletion of a stack being separated, said separating mechanism including vertically extending guide means for supporting a stack of containers to be separated in vertically extending relation, said guide means having an upper end through which a stack of containers to be separated descends, finger means movable into and out of engagement with the containers of the stack in said guide means and operable to separate said containers, one at a time, from the bottom of said stack, and at least one holding shoe disposed below said finger means and operable to support the stack of containers in said guide means while said finger means is disengaged from said stack, said feed mechanism including means defining a path for receiving and retaining a plurality of unpackaged stacks of said containers, adjacent ones of said stacks being in contact with one another and one end of said path terminating at a staging station adjacent to the upper end of said guide means, conveyor means for advancing stacks of containers on said path toward and onto said staging station, and shiftable means for effecting movement of a stack of containers on said staging station over the upper end of said guide means prior to or upon depletion of a stack being separated, said shiftable means comprising means for holding the stack of containers in the staging station out of contact with the stack being separated;

said holding shoe being mounted for pivotal movement about a horizontal axis adjacent to said guide means, each of the containers defining a peripheral lip, and said holding shoe supporting the peripheral lip of the lowermost container of the stack being separated at a selected vertical position with respect to the guide means, thereby supporting the stack being separated.

3. The apparatus of claim 2, in which said finger means includes at least one holding finger movable toward and away from said stack and operable to hold said stack of containers during a separating operation, said finger means also includes at least one stripping finger movable toward and away from said stack and operable to engage the lowermost container of the stack in said guide means and separate the same from said stack, and said separating mechanism includes actuating means for effecting synchronized, cyclic movement of said holding and stripping fingers so that containers are sequentially separated from the lower end of said stack.

4. The improvement of claim 3, in which said actuating means includes rotatable cam means for controlling said pivotal movement of said holding shoe, and said holding shoe includes a follower adapted to engage said cam means.

5. The improvement of claim 4, in which said actuating means includes a horizontally extending, rotatably mounted shaft, said cam means is mounted on and rotatable with said shaft, and said holding shoe is adapted to be positioned between said cam means and the lowermost container of said stack.

6. The improvement of claim 5, in which said cam means includes a composite cam member having a central cam section and an adjacent pair of spaced cam sections, said holding shoe follower is adapted to engage said central cam section, and said holding finger follower is adapted to engage said pair of cam sections.

7. The improvement of claim 6, in which said central cam section has working and base circle portions, and said spaced pair of cam sections are cylindrical and of a greater diameter than the working and base circle portions of said central cam sections so that said holding shoe follower is confined between and guided by said cylindrical cam sections.

8. The improvement of claim 7, in which said central and spaced pair of cam sections of said composite cam are integral.

9. The improvement of claim 8, in which said cam means includes another cam member spaced from said composite cam member and rotatable in unison therewith, and said stripping finger has a cam follower adapted to engage said other cam member.

10. The improvement of claim 9, in which said other cam member comprises a jump-type cam.

11. The improvement of claim 3, in which a laterally spaced pair of said holding shoes are provided and adapted to engage the lowermost container of said stack.

12. The improvement of claim 11, in which said actuating means includes a laterally spaced pair of cam means respectively adapted to effect pivotal movement of said holding shoes.

13. The improvement of claim 12, in which said actuating means includes a laterally spaced pair of horizontally extending, rotatably mounted shafts, said cam means are respectively mounted on and rotatable with said shafts, and said holding shoes are respectively adapted to be positioned between said cam means and the lowermost container of said stack.

14. In a mechanism for separating nested, cup-shaped, containers from the lower end of a vertically extending stack thereof in which the containers in said stack open upwardly, each of said containers having a sidewall and an outwardly projecting lip around the rim thereof, said mechanism including vertically extending guide means for supporting said stack of containers in vertically extending relation, at least one holding finger movable toward and away from said stack and operable to hold said stack of containers during a separating operation, at least one stripping finger movable toward and away from said stack and operable to engage the lip of the lowermost container of said stack and shift said container downwardly relative to said stack so that said container is separated therefrom, and actuating means for effecting synchronized, cyclic movement of said holding and stripping fingers toward and away from said stack and pivotal movement of said stripping finger so as to cause containers to be sequentially separated from the lower end of said stack, the improvement of holding means adapted to be mounted below said holding finger so as to be movable toward and away from said stack, said holding means also being adapted to engage the lip of the lowermost container of the stack in order to support the stack and limit downward movement thereof when said holding and stripping fingers move away from said stack during a separated cycle.

15. The improvement of claim 14, in which said holding means comprises at least one holding shoe having an end adapted to engage said lip at a predetermined position along the length of the guide means, said at least one holding shoe operative to support the entire weight of the stack when said holding and stripping fingers move away from said stack.

16. The improvement of claim 15, in which said holding shoe is adapted to be mounted for pivotal movement about a horizontal axis adjacent to said guide means.

17. The improvement of claim 16, in which said holding shoe includes an upright section having upper and lower end portions, said lower end portion is adapted to be mounted for pivotal movement about said axis, and said upper end portion extends generally horizontally.

18. The improvement of claim 17, in which said generally horizontally extending upper end portion is substantially L-shaped, the longer leg of said L extends perpendicularly to said upright section and has an inner end adapted to engage the sidewalls of the containers in said stack, and the shorter leg of said L extends upwardly from said longer leg and has an upper end adapted to engage the underside of the lip of said container.

19. The improvement of claims 15, 16, 17 or 18, in which said actuating means includes a horizontally extending, rotatably mounted shaft, cam means is mounted on and rotatable with said shaft, and said holding shoe is adapted to be positioned between said cam means and the lowermost container of said stack.

20. The improvement of claim 19, in which a laterally spaced pair of said holding shoes are provided and respectively adapted to engage laterally opposite portions of the side wall and underside of the lip of the lowermost container of said stack.

21. The improvement of claim 20, in which said actuating means includes a laterally spaced pair of cam means respectively adapted to effect pivotal movement of said holding shoes.

22. The improvement of claim 21, in which said actuating means includes a laterally spaced pair of horizontally extending, rotatably mounted shafts, said cam means are respectively mounted on and rotatable with said shafts, and said holding shoes are respectively adapted to be positioned between said cam means and the lowermost container of said stack.

23. A feed mechanism adapted to automatically supply stacks of nested containers to a separating mechanism, or the like, wherein the containers in each stack to be separated by said mechanism are cup-shaped and arranged in nested, vertically extending relation, said feed mechanism comprising means defining a path for receiving a plurality of unpackaged stacks of said containers arranged one behind the other with adjacent stacks in contact with one another, means defining a staging station at one end of said path, conveyor means for transporting stacks of containers on said path toward and onto said staging station, and means for effecting movement of a stack of said containers off of said staging station and into said separating mechanism prior to or upon depletion of a stack of containers being separated by said separating mechanism, said movement effecting means comprising means for maintaining the stack in the staging station out of contact with the stack of containers in the separating mechanism;

in which said staging station has upstream and downstream ends and comprises a portion of said conveyor means, said maintaining means comprises at least one stop member at the downstream end of said staging station, said stop member is movable to a first position extending into said path so as to engage and prevent movement of a stack of said containers on said staging station over the upper end of said guide means, and said stop member is also movable to a second, retracted position removed from said path, said stop member operating to prevent a stack of containers on said staging station from moving over the upper end of said guide means when said stop member is in said first position and to allow said stack of containers on said staging station to move over the upper end of said guide means when said stop member is in said second position.

24. The feed mechanism of claim 23, in which said separating mechanism includes vertically extending guide means for receiving and guiding movement of a stack of containers being separated, said guide means has an upper end, and said means for effecting movement of said stack of containers off of said staging station is adapted to move said stack over the upper end of said guide means for descent therein.

25. The feed mechanism of claim 23, in which at least one lever is mounted at one side of said path for pivotal movement about a vertical axis, one end of said lever is movable between said first and second positions, the opposite end of said lever is adapted to engage cam means for pivoting said lever between positions causing said one end of said lever to move between said first and second positions, and said stop member is mounted on said one end of said lever.

26. The feed mechanism of claim 25, in which at least one horizontally extending, plate-like gate member is shiftably mounted at one side of said path for movement between a first, retracted position spaced from the upper end of said guide means and a second position at least partially extending across the upper end of said guide means, said cam means comprises a slot in said gate member, and actuating means is provided for shifting said gate member between said first and second positions thereof, whereby a stack of containers on said staging station will be caused to advance onto said gate member by the next stack of containers on said conveyor means when said actuating means shifts said gate member to said second position.

27. The feed mechanism of claim 26, in which a pair of said levers and a pair of said plate-like gate members are respectively mounted on the opposite sides of said path, and said actuating means effects simultaneous movement of said gate members between said first and second positions.

28. The feed mechanism of claim 27, in which an upstanding, plate-like door member is carried by each of said levers, and said door members are arranged to extend substantially transversely with respect to said path and form extensions of said guide means when said one end of each of said levers is in said first position.

29. The feed mechanism of claim 27, in which a first control member associated with said guide means is provided for causing said actuating means to shift said gate members to said first position and a second control member associated with said guide means is provided for causing said actuating means to shift said gate members to said second position.

30. The feed mechanism of claim 29, in which said first control member includes a movable tripping member having a portion adapted to extend into said guide means above said gate members and movable to a position causing said first control member to cause said actuating means to shift said gate members to said first position when a stack of containers is operatively positioned in said guide means, and said second control member includes a movable tripping member having a portion adapted to extend into said guide means below said gate members and movable to a position causing said second control member to cause said actuating means to shift said gate members to said second position when the upper container of a stack descending in said guide means moves out of engagement with the tripping member of said second control member.

* * * * *

UNITED STATES PATENT AND TRADEMARK OFFICE
CERTIFICATE OF CORRECTION

PATENT NO. : 4,529,101
DATED : July 16, 1985
INVENTOR(S) : Gerald J. Orlowski

It is certified that error appears in the above-identified patent and that said Letters Patent is hereby corrected as shown below:

In column 13, line 61, please delete "4,156" and substitute therefor --154,156--;

In column 13, line 62, please delete "8" and substitute therefor --158--;

In claim 14 (column 18, line 27), please delete "separated" and substitute therefor --separating--.

Signed and Sealed this

Twenty-eighth Day of October, 1986

[SEAL]

*Attest:*

DONALD J. QUIGG

*Attesting Officer*     *Commissioner of Patents and Trademarks*